(12) United States Patent
Gluzman et al.

(10) Patent No.: US 8,446,107 B2
(45) Date of Patent: May 21, 2013

(54) SMART CLAMP

(75) Inventors: Yefim Gluzman, San Francisco, CA (US); Quyen Tran, Morgan Hill, CA (US); Kamlapati Khalsa, San Jose, CA (US)

(73) Assignee: ZiLOG, Inc., Milpitas, CA (US)

( * ) Notice: Subject to any disclaimer, the term of this patent is extended or adjusted under 35 U.S.C. 154(b) by 353 days.

(21) Appl. No.: 12/932,417

(22) Filed: Feb. 23, 2011

(65) Prior Publication Data

US 2012/0212139 A1 Aug. 23, 2012

(51) Int. Cl.
*H05B 37/00* (2006.01)

(52) U.S. Cl.
USPC ........... 315/307; 315/308; 315/291; 315/360; 315/DIG. 5; 327/442; 327/440; 327/421

(58) Field of Classification Search
USPC ............. 315/125, 247, 246, 224, 209 R, 291, 315/307, 308, 360, 362, DIG. 5; 327/416, 327/421, 427, 440, 442, 447, 514
See application file for complete search history.

(56) References Cited

U.S. PATENT DOCUMENTS

| | | | | |
|---|---|---|---|---|
| 6,037,722 A * | 3/2000 | Moisin | ........................ | 315/307 |
| 6,486,725 B2 * | 11/2002 | Boggs et al. | .................. | 327/514 |
| 6,859,644 B2 * | 2/2005 | Wang | ........................ | 455/159.2 |
| 7,061,188 B1 * | 6/2006 | Katyl et al. | .................... | 315/291 |
| 7,307,542 B1 * | 12/2007 | Chandler et al. | ............. | 340/9.16 |
| 7,446,671 B2 * | 11/2008 | Giannopoulos et al. | ... | 340/12.24 |
| 7,528,558 B2 * | 5/2009 | Yu et al. | ........................ | 315/308 |
| 8,358,087 B2 * | 1/2013 | Tran et al. | ..................... | 315/307 |
| 2004/0183468 A1 * | 9/2004 | Nostwick | ...................... | 315/247 |

* cited by examiner

*Primary Examiner* — Haiss Philogene
(74) *Attorney, Agent, or Firm* — Imperium Patent Works; T. Lester Wallace

(57) ABSTRACT

In a circuit that turns off a fluorescent lamp, clamping circuitry is provided to dissipate energy stored in a ballast when the lamp is being turned off. In a normal state in which the lamp is on, or in a normal state in which the lamp is off, clamping is not performed as long the VDS of a power switch is below a voltage A. In a lamp turn off operation, the switch is turned on for a time period to extinguish the lamp, and is then made to operate as a clamp (operate in its linear region) for a second period of time to dissipate energy that was stored in the ballast. Clamping in the linear region continues for VDS voltages down to B as ballast energy is dissipated, where B is smaller than A. By clamping down to the lower voltage B, re-ignition of the lamp is prevented.

26 Claims, 20 Drawing Sheets

RF-ENABLED STARTER UNITS TURN-OFF FLUORESCENT
LAMPS OF MULTI-LAMP LIGHT FIXTURE

TURN-OFF OF MULTIPLE FLUORESCENT LAMPS

LAMP IS ON

STARTER RECEIVES TURN OFF COMMAND

INITIATE TURN OFF – TURN ON THE SWITCH

INITIATE TURN OFF OF THE SWITCH AT THE APPROPRIATE TIME
(L-TYPE TIMING OR C-TYPE TIMING)
- ENABLE VOLTAGE CLAMP
- OPERATE SWITCH IN LINEAR MODE

OPERATE SWITCH IN LINEAR MODE UNTIL RECTIFIED
VOLTAGE DECREASES TO A PREDETERMINED VOLTAGE

SWITCH IS FULLY OFF

LAMP TURN OFF IS COMPLETE

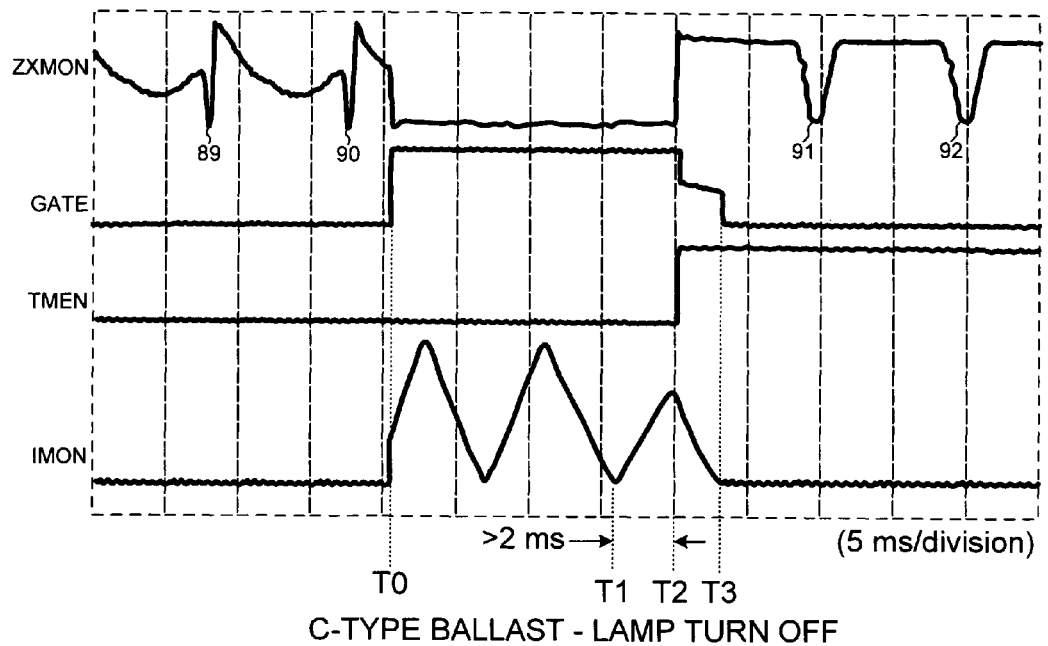
FIG. 13 — C-TYPE BALLAST - LAMP TURN OFF
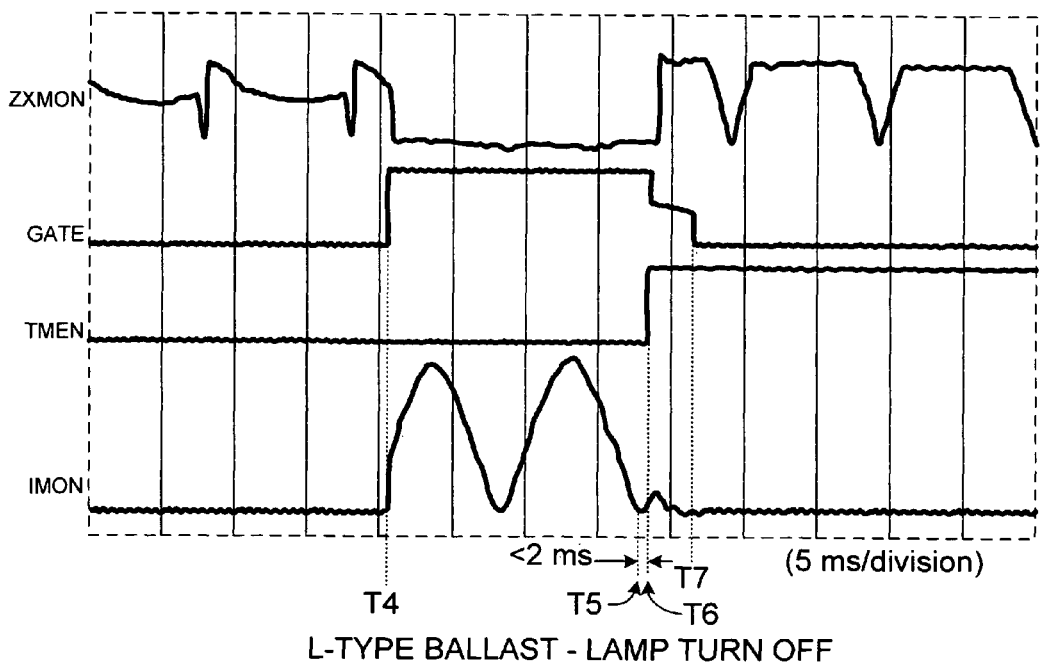
FIG. 14 — L-TYPE BALLAST - LAMP TURN OFF

SHAPE OF THE ZERO-CROSSING SIGNAL WHEN
THE LAMP IS ON AND WHEN THE LAMP IS OFF

HOT SOCKET INSERT BALLAST TYPE
DETECTION METHOD

SMART CLAMP

TECHNICAL FIELD

The described embodiments relate generally to starter units for fluorescent lamps.

BACKGROUND INFORMATION

Fluorescent light fixtures include tubular fluorescent bulbs. A fluorescent bulb is also referred to here as a fluorescent lamp. The tube is a glass tube that contains an ionizable gas and a small amount of mercury. There are filaments at each end of the tube. Upon application of proper electrical voltages, the filaments can be made to heat up and to ionize the ionizable gas in the tube. If a voltage of adequate magnitude is then provided between the filaments, an electrical arc can be started through the gas in the tube between the filaments. The arc involves a flow of current from one filament, through the ionized gas, and to the other filament. Energetic electrons in this current flow collide with the mercury atoms, thereby exciting the mercury atoms and causing them to emit ultraviolet radiation. The emitted ultraviolet radiation is absorbed by and excites a phosphor coating on the inside of the walls of the tube. The phosphor coating fluoresces and emits radiation in the visible spectrum (i.e., visible light). The visible light passes outward through the glass and is usable for illuminating purposes.

Some such fluorescent light fixtures involve a circuit referred to as a "starter" or a "starter unit". In a first step, a switch in the starter unit closes and forms an electrical connection between the filament at one end of a tube and the filament at the other end of the tube such that an alternating current can flow from an AC power source, through an inductive ballast, through one filament, through the closed switch of the starter, and through the second filament, and back to the AC power source. This alternating current flow causes the filaments to heat. The heating of the filaments causes gas surrounding the filaments to ionize. Once the gas is ionized in this way, then the switch in the starter unit is opened. The opening of the switch cuts current flow through the inductive ballast, thereby causing a large voltage spike to develop. Due to the circuit topology, this large voltage is present between the two filaments. The voltage is large enough to strike an arc through the gas. Once the arc is established, the resistance between the two filaments through the gas decreases. This allows the current to continue to flow through the gas without a large voltage being present between the filaments. The switch is left open, the current continues to flow, filaments continue to be heated, the arc is maintained, and the current flow is regulated by the ballast. The fluorescent lamp is then said to be on. The lamp emits visible light to illuminate an area.

In fluorescent light fixtures, the starter unit may fail. The starter unit is therefore sometimes made to be a replaceable unit. Great numbers of fluorescent light fixtures with replaceable starter units are installed throughout the world. Large numbers of such fluorescent light fixtures are installed in public buildings, office buildings, and other large buildings. Quite often the fluorescent lights are left on and consume electrical energy even though the area served does not need to be illuminated. A way of preventing this waste of electrical energy is desired.

Infrared motion detecting wall switches are often employed to prevent the waste of energy due to lights being left on when lighting is not needed. If an infrared motion detector in the wall switch does not detect motion of an infrared emitter (for example, a human body) in the vicinity of the wall switch, then circuitry in the wall switch determines that the room is not occupied by a person. Presumably if a person were in the room, the person would be moving to some extent and would be detected as a moving infrared emitter. If the wall switch determines that the room is unoccupied because it does not detect any such moving infrared emitter, then the wall switch turns off the fluorescent lights on the circuit controlled by the wall switch. The wall switch turns off the fluorescent lights by cutting AC power flowing to the fluorescent lamp light fixtures through power lines hardwired into the building. If, however, the wall switch detects a moving infrared emitter, then the wall switch turns on the lights by energizing the hardwired power lines so that AC power is supplied to the fluorescent light fixtures through the hardwired power lines.

The wall switch motion detection system involving hardwired power lines embedded in the walls and ceilings of buildings is quite popular, but a wireless system has been proposed whereby each of the replaceable starter units is to be provided with an RF receiver. The starter unit is then to turn on or off the fluorescent lamp of its light fixture in response to RF commands received from a central motion detecting occupancy detector. If a person enters a room provided with such a system, then the central motion detector detects motion and issues RF commands to the starter units in the light fixtures to turn on their respective fluorescent lamps. If the central motion detector fails to detect motion for an amount of time and determines that the room is not occupied, then the central motion detector issues RF commands to the starter units to turn off their respective fluorescent lamps, thereby preventing wasted electrical power that would otherwise be consumed illuminating the unoccupied room.

In a proposed system, different timing is to be employed in a starter unit to turn off a fluorescent lamp depending on the type of ballast being used. There are many types of ballasts used to limit current flow through fluorescent lamps including ballasts referred to here as L-type ballasts and including ballasts referred to here as C-type ballasts. An L-type ballast is generally an inductor whereas a C-type ballast is an inductor that includes a series capacitor. In the proposed system, each starter unit attempts to detect the type of ballast to which it is connected. If the starter unit detects it is connected to an L-type ballast, then it uses turn off timing more appropriate for lamps having L-type ballasts. If the starter unit detects it is connected to a C-type ballast, then it used turn off timing more appropriate for lamps having C-type ballasts. Often times a light fixture employing multiple lamps will include one L-type ballast and one C-type ballast so that the overall power factor of the light fixture is suitable. The starter units in the fixture of the proposed system therefore would use different timings to turn off the lamps. Other times a light fixture employing multiple lamps will include two C-type ballasts, or will include two L-type ballasts. The starter units in these fixtures of the proposed system would use the same timings to turn off the lamps.

SUMMARY

A starter unit (for example, an RF-enabled and replaceable starter unit) has an ability both to turn on a fluorescent lamp and to turn off the lamp. The starter unit detects whether a ballast in the circuit with the fluorescent lamp is of a first type (for example, a L-type ballast) or is of a second type (for example, a C-type ballast). In one novel aspect, the determination is made by determining a periodicity of a transient oscillatory response that results from turning on the switch of the starter unit during a preheat operation. If the determination is that the ballast is likely of the first type, then the starter unit turns off the lamp in a first way (for example, using C-type timing and then using L-type timing alternatingly). C-type timing may involve putting the switch of the starter unit into a linear mode of operation at the end of the turn off operation at a different time than does L-type timing. If, on the other hand, the determination is that the ballast is likely of the second type then the starter unit turns off the lamp in a second way (for example, using only C-type timing and using substantially no L-type timing).

In an example in which AC mains power is 230 volts and fifty hertz, in both the L-type and C-type turn off timings the switch of the starter unit is pulsed on for a duration of more than twenty milliseconds and less than fifty milliseconds, and this pulse on time is followed by a duration of less than ten milliseconds when the switch is operated in the linear mode.

Using the novel alternative pattern turn off method, the same starter unit design is usable both in single-lamp light fixtures and in multi-lamp light fixtures where a mix of ballast types may be used. If a multi-lamp light fixture involves both an L-type ballast and a C-type ballast, then the lamp provided with the C-type ballast will only be turned off using C-type turn off timing that is safe for the switch in the starter unit. The lamp provided with the L-type ballast will experience an initial turn off attempt using C-type timing. Use of C-type timing increases the chance that both lamps will be turned off simultaneously without a later turn off operation erroneously re-igniting a previously turned off lamp. If the lamp does not turn off, however, due to the use of weaker C-type turn off timing on a lamp coupled to a L-type ballast, then a later turn off attempt on the lamp will use L-type timing. In situations in which a starter unit of this design is used in a single-lamp light fixture, a lamp coupled to a L-type ballast will experience, in addition to C-type turn off timing, the more effective L-type turn off timing. A lamp in a single-lamp light fixture with a C-type ballast will experience only C-type turn off timing attempts.

In another novel aspect, the replaceable fluorescent lamp starter unit described above has a hot socket insert capability. The starter unit determines if it needs to determine ballast type. The starter unit may determine it needs to determine ballast type due to any one of a number of different conditions occurring. One condition is the starter unit detecting that it has powered up as a result of a hot socket insert event. After determining that it needs to determine ballast type, the starter unit determines whether the lighting fixture into which the starter unit is plugged in is in a first state (for example, the lamp of the lighting fixture is off) or is in a second state (for example, the lamp of the lighting fixture is on). In one example, the starter unit determines whether the lamp is on or off by examining a voltage signal ZXMON indicative of a voltage between the filaments of the lamp. The ZXMON signal has a different wave shape depending on whether the lamp is on or off. If the determination is that the lighting fixture is in the first state (lamp is off) then the starter unit uses a first method to detect a ballast type, whereas if the determination is that the lighting fixture is in the second state (lamp is on) then the starter unit uses a second method to detect ballast type.

The first method of determining ballast type may involve turning on the power switch of the starter unit at a time after a zero-crossing of the ZXMON signal and then using the periodicity of a transient switch current IMON signal to determine ballast type. The second method of determining ballast type may involve turning on the power switch approximately at the time of the zero-crossing of the ZXMON signal and then using peak amplitude information regarding one or more peaks of the transient switch current IMON to determine ballast type. In both the first and second methods of detecting ballast type, the power switch is turned off at the end of the ballast type determining operation and this causes the lamp to go back on. In one example, the lamp is only off for about twenty milliseconds during the ballast type determining operation following hot socket inserting of the starter unit.

In another novel aspect, the replaceable fluorescent lamp starter unit described above has a smart clamp. The smart clamp is a part of a smart clamp and control circuit that drives the gate of the power switch. The smart clamp and control circuit includes the smart clamp and a voltage translation and gate drive circuit. In one example, the smart clamp is coupled between the drain of the power switch and the gate of the power switch. In one example, the smart clamp includes a first zener diode, a second zener diode coupled in series with the first zener diode, and a transistor coupled in parallel with the second zener diode.

A fluorescent lamp can be extinguished in a cycle involving four steps. A first step involves driving the gate of the power switch in a first mode such that the power switch is off (provided the drain-to-source voltage of the power switch (VDS) does not exceed voltage A). In this condition, in one example, the fluorescent lamp is on in normal operation. The power switch is not operating as a clamp nor is it conducting current. A second step involves driving the gate in a second mode such that the power switch is fully turned on and conductive. In the example with the fluorescent lamp, this turning on of the power switch extinguishes the lamp but energy still remains stored in the inductance of the ballast of the fluorescent lamp fixture. A third step involves driving the gate in a third mode such that the power switch operates in its linear region if VDS exceeds a voltage B but is off if VDS is less than B, where A is greater than B. In this third mode, the power switch operates as a clamp for VDS voltages down to voltage B. This clamping action dissipates energy previously stored in the inductance of the ballast and prevents re-igniting the fluorescent lamp. A fourth step involves driving the gate in the first mode such that the power switch is off (provided VDS of the power switch does not exceed voltage A). The power switch is not operating as a clamp nor is it conducting current as long as VDS does not exceed voltage A.

Voltage A may, for example, be a voltage slightly below the maximum peak voltage that may appear across the fluorescent lamp when the lamp is operating normally in the off state and when AC mains power is present across the lamp. Voltage B may, for example, be a voltage substantially below voltage A. Voltage B may be a voltage slightly below a voltage at which the fluorescent lamp may otherwise re-ignite were the smart clamping action down to voltage B not performed. In a turn off operation of the fluorescent lamp, the steps are performed in the order of the first, second, third and fourth steps. The smart clamp, power switch, and the voltage translation and gate drive circuit are not only usable in a fluorescent lamp application, but rather are of general applicability and are usable in other applications where current through an inductive element is to be stopped and in which energy stored in the inductive element is to be dissipated without the inductive element generating a large voltage spike.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 13 is a waveform diagram that illustrates how the switch of the starter unit is made to pulse on and off in a C-type timing turn off operation.

FIG. 14 is a waveform diagram that illustrates how the switch of the starter unit is made to pulse on and off in an L-type timing turn off operation.

DETAILED DESCRIPTION

Reference will now be made in detail to background examples and some embodiments of the invention, examples of which are illustrated in the accompanying drawings.

Figure 1:
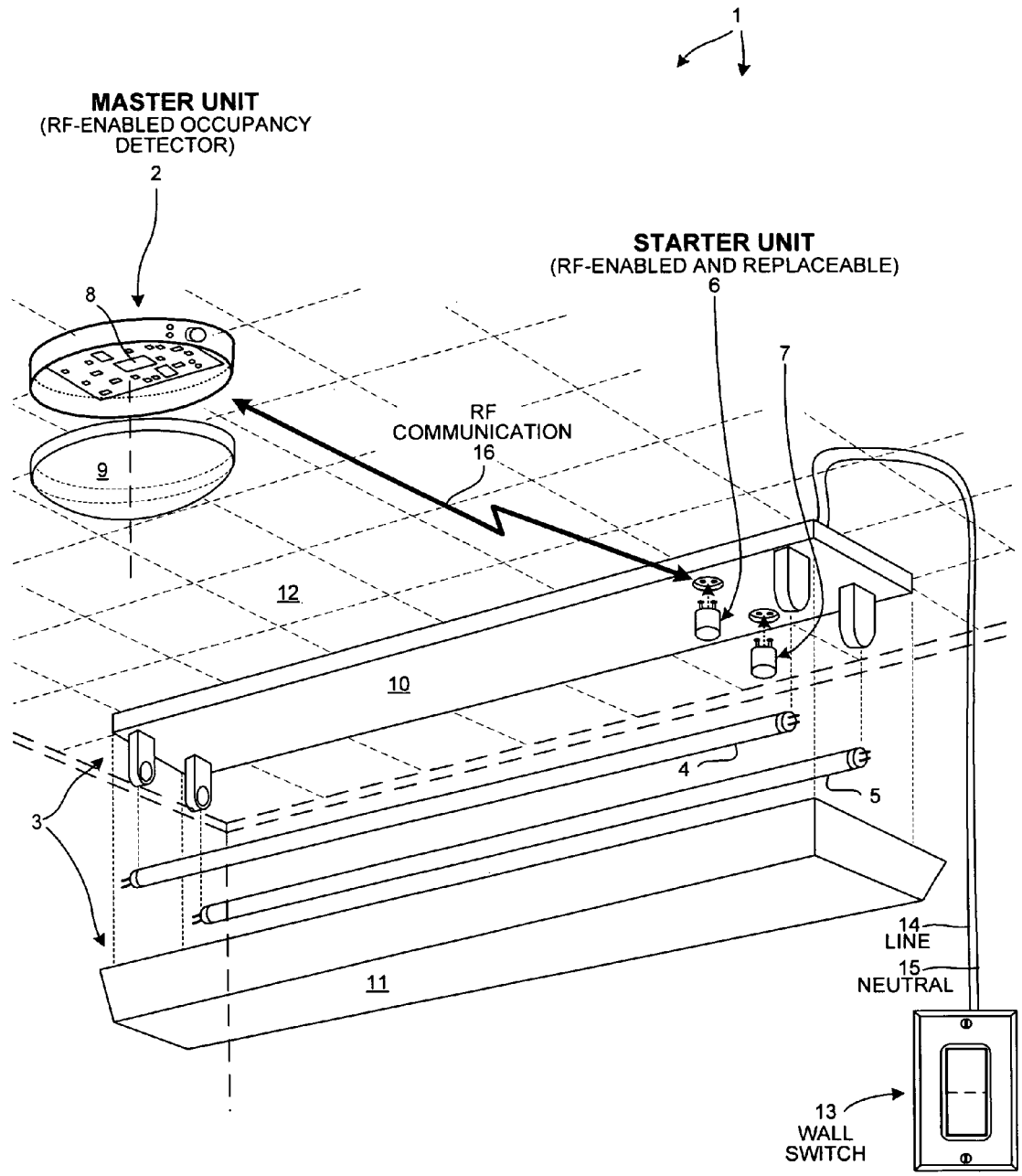
FIG. 1 is a perspective diagram of a system involving a multi-lamp light fixture, where the fluorescent lamps in the fixture can be turned off by RF-enabled and replaceable starter units.

FIG. 1 is a diagram of a system 1 for turning off a fluorescent lamp that includes a master unit 2 and a plurality of multi-lamp fluorescent light fixtures having fluorescent lamp starter units. For illustrative purposes, one multi-lamp fluorescent light fixture 3 is pictured in FIG. 1. Other multi-lamp fluorescent light fixtures of system 1 are not pictured. Multi-lamp fluorescent light fixture 3 includes two fluorescent lamps 4 and 5 and starter units 6 and 7 associated with each lamp, respectively. In this example, master unit 2 is an infrared occupancy detector involving a Passive InfraRed (PIR) sensor 8 and a multi-section fresnel lens 9. Using techniques well known in the art, master unit 2 detects motion of infrared emitters in the field of view of fresnel lens 9 and detects the lack of motion of such infrared emitter. If the master unit detects motion, then the master unit turns on or keeps on the fluorescent lamps of the fluorescent light fixtures of system 1. If, on the other hand, the master unit does not detect motion, then the master unit turns off the fluorescent lamps of system 1 to conserve electrical energy. In another example, master unit 2 includes an ambient light detector useable to indicate available ambient light. Based on the available ambient light, the master unit may turn off fluorescent lamps of the multi-lamp fixture 3 of system 1 to conserve electrical energy. In the illustration of FIG. 1, multi-lamp light fixture 3 includes a base portion 10, a translucent cover portion 11, the fluorescent bulbs or lamps 4 and 5, and their associated starter units 6 and 7, respectively. Ballasting inductances (not shown) are included with fluorescent lamps 4 and 5. Both the multi-lamp light fixture 3 and the master unit 2 are fixed to the ceiling 12 of a room in a building as shown. A wall switch 13 is connected by electrical wires 14 and 15 to all the light fixtures of system 1 in standard fashion so that a person in the room can manipulate the wall switch to turn on, and to turn off, the fluorescent lights. The electrical wires 14 and 15 are embedded in the walls and ceiling of the building. In the illustrated example, wire 14 is the LINE conductor, whereas wire 15 is the NEUTRAL conductor.

Master unit 2 has a radio-frequency (RF) transceiver (transmitter and receiver) for engaging in RF communication, including an RF communication 16 with the starter units 6 and 7 of system 1. As pictured, master unit 2 need not be connected to any hardwired electrical wiring in the building. The master unit 2 is a self-contained, battery-powered unit that is fixed to the ceiling 12 of the room illuminated by system 1. Master unit 2 can be easily fixed to ceiling 12 by application of adhesive tape or by a screw or other common attachment mechanism.

Figure 2:
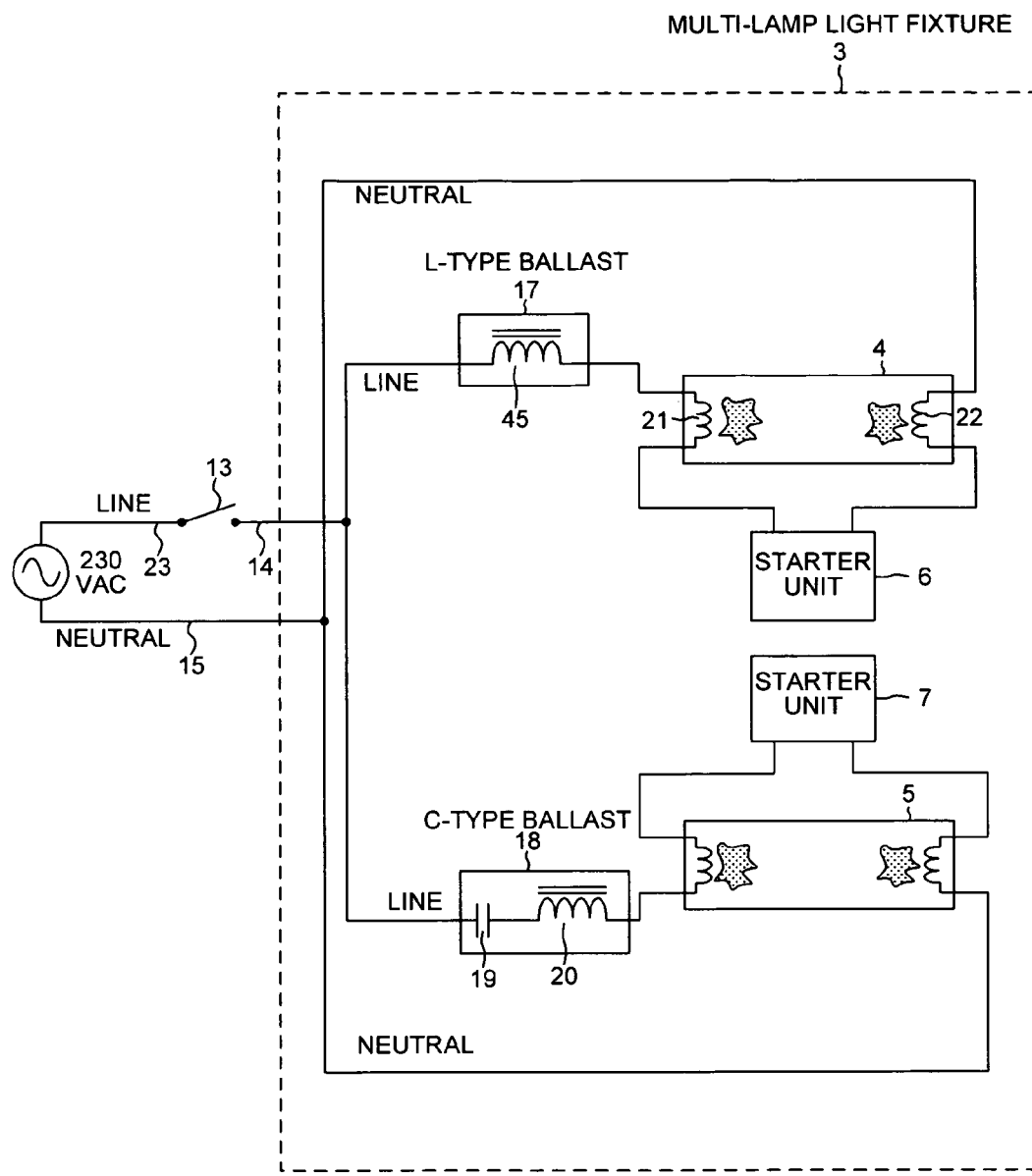
FIG. 2 is a simplified circuit diagram of the multi-lamp light fixture of FIG. 1.

FIG. 2 is a circuit diagram of multi-lamp light fixture 3 of FIG. 1. The lamp 4 is provided with an L-type ballast 17, whereas the lamp 5 is provided with a C-type ballast 18. The C-type ballast 18 includes a capacitor 19 in series with an inductor 20, whereas the L-type ballast 17 includes only an inductor 45 and no series-connected capacitor. Inductor 45 is also referred to here as an inductive element. To turn on lamp 4, for example, the starter unit 6 forms an electrical connection between filaments 21 and 22 of lamp 4. A current then begins to flow from the AC mains LINE conductor 23, through wall switch 13 (which is closed in this example), through conductor 14, through ballast 17, through filament 21, through starter unit 6, through filament 22, through NEUTRAL conductor 15 and back to the AC mains. The filament heats and ionizes the ionizable gas in lamp 4. The starter unit 6 is then made to open the electrical connection. When current stops in the inductor of ballast 17, the voltage between the filaments 21 and 22 rises rapidly, and this strikes an arc through the gas in the lamp between the filaments, thereby turning on the lamp. The same basic turn on process is used to turn on lamp 5.

Figure 3:
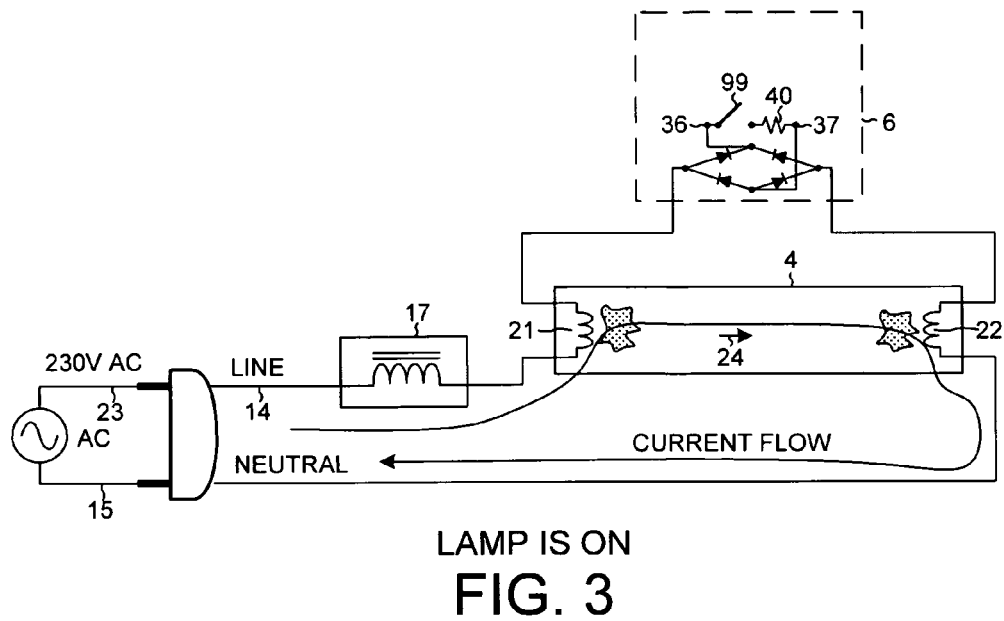
FIGS. 3-8 is a sequence of diagrams that illustrate steps in the turn off of a fluorescent lamp using a starter unit in the multi-lamp light fixture of FIG. 1.
Figure 4:
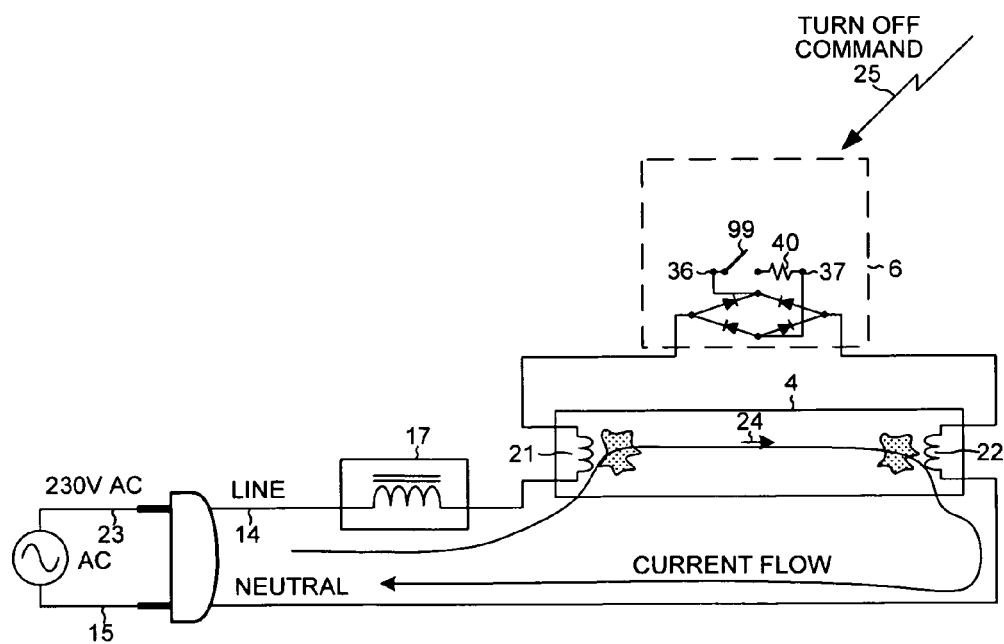
Figure 5:
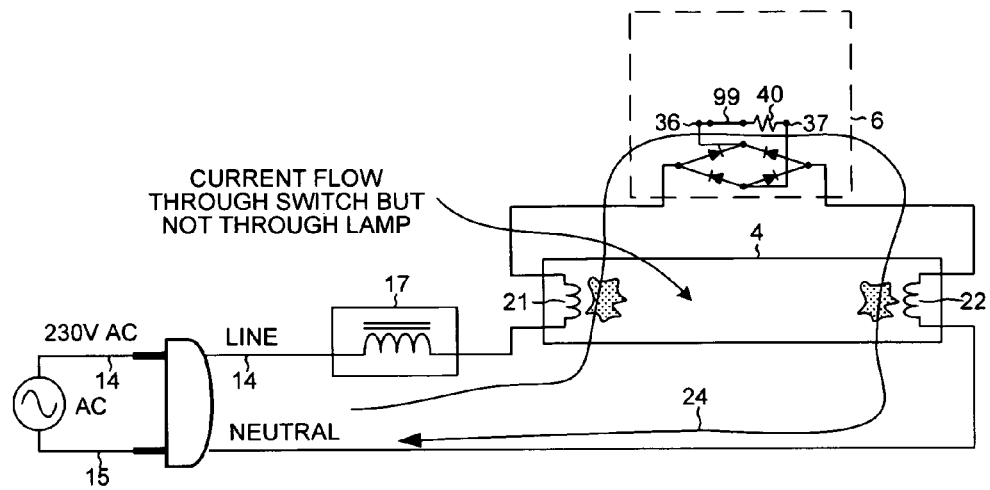
Figure 6:
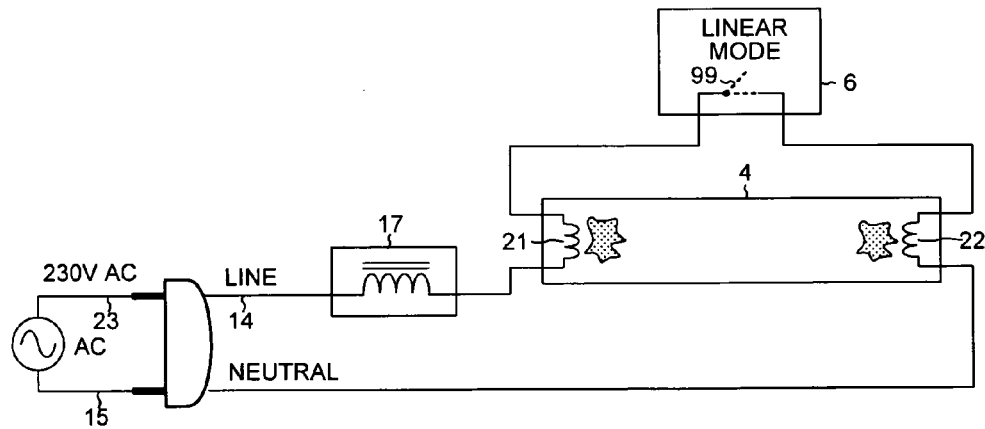
Figure 7:
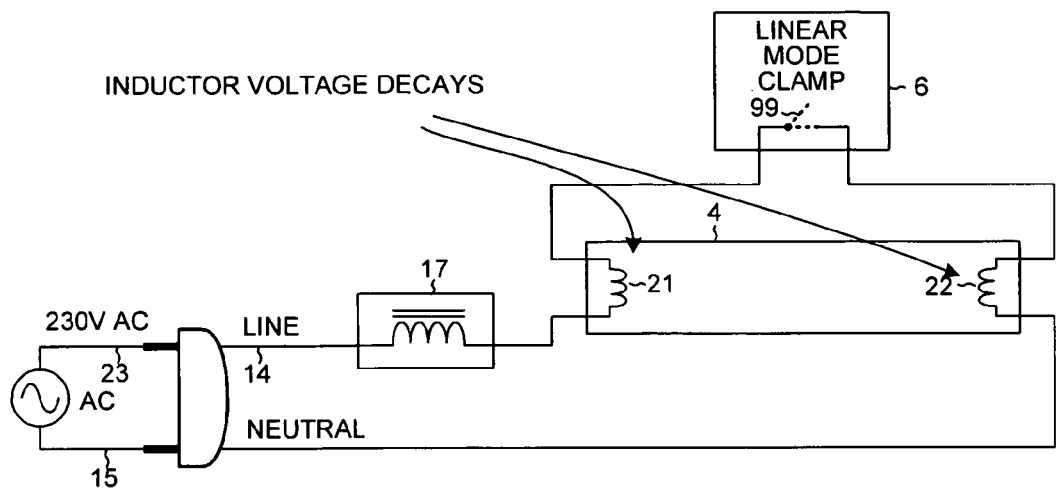
Figure 8:
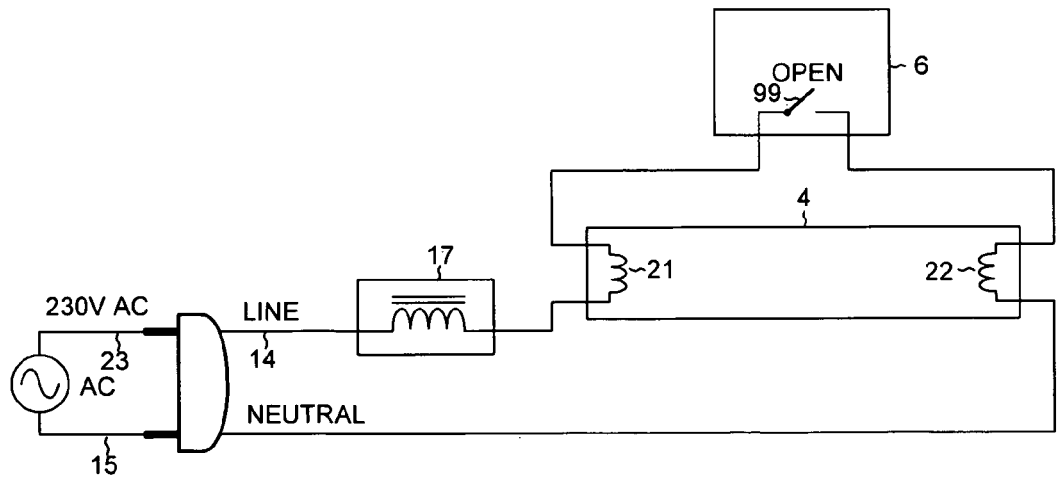

FIG. 3-8 illustrate steps in the process of turning off a lamp (for example, lamp 4) using a starter unit. Initially, lamp 4 is on as is illustrated in FIG. 3. A switch 99 in starter unit 6 is off (open). Current 24 flows through the lamp as illustrated. Next, as illustrated in FIG. 4, the turning off of lamp 4 is caused by receipt of a turn off command 25 received from master unit 2. Turn off command 25 instructs the starter unit 6 to turn off lamp 4. Next, as illustrated in FIG. 5, switch 99 closes such that current 24 now flows through the switch 99 in the starter unit and not through the lamp. Next, as illustrated in FIG. 6, the turn off of switch 99 is initiated. In this example, the switch is a MOS power transistor that is put into its linear mode of operation. A voltage clamp circuit is enabled and this is illustrated in FIG. 6 by showing switch 99 in a dashed representation. The voltage clamp circuit keeps switch 99 operating in its linear mode until the voltage across the filaments 21 and 22 drops to a predetermined voltage. Operation in the linear mode is illustrated in FIG. 7. When the voltage across the filaments drops sufficiently (as detected inside the starter unit by a rectified voltage falling to a predetermined voltage), then the voltage clamp circuit causes switch 99 to be fully turned off. As illustrated in FIG. 8, the switch 99 is fully off and the lamp 4 is off.

Figure 9:
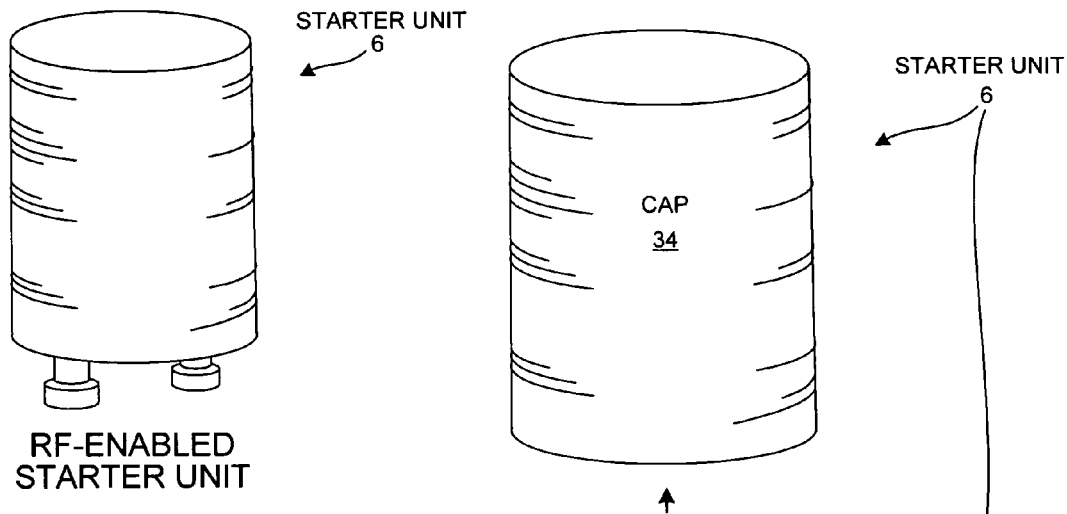
FIG. 9 is a perspective view of one of the RF-enabled starter units of the system of FIG. 1.

FIG. 9 is a perspective view of starter unit 6.

Figure 10:
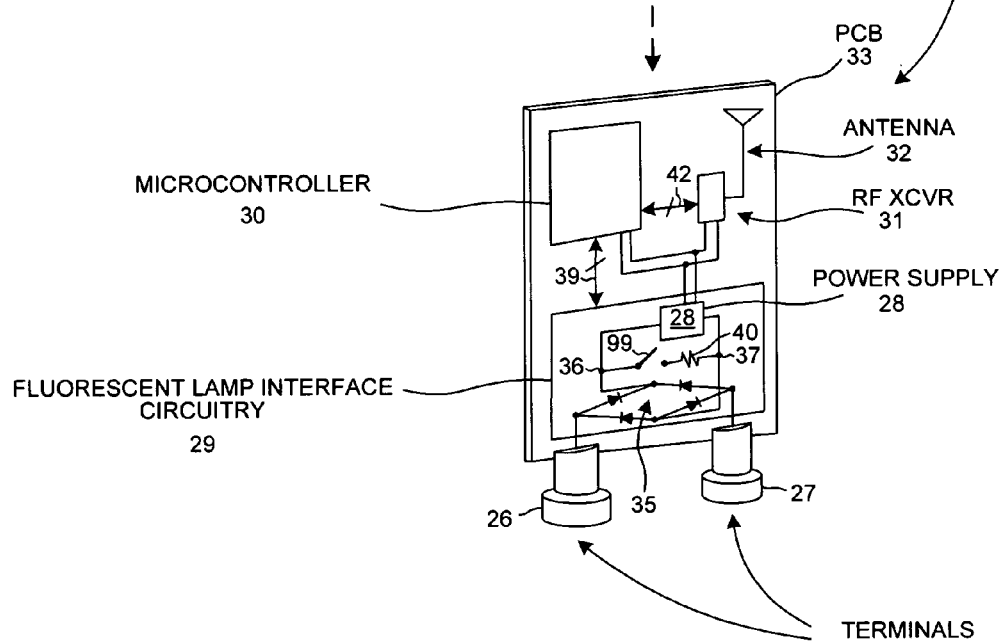
FIG. 10 is an exploded perspective view of the RF-enabled starter unit of FIG. 9.

FIG. 10 is an exploded perspective view of starter unit 6. Starter unit 6 includes a first terminal 26, a second terminal 27, a power supply 28, fluorescent lamp interface circuitry 29, a microcontroller integrated circuit 30, an RF transceiver 31 and an antenna 32. This circuitry is disposed on a printed circuit board (PCB) 33 as illustrated. PCB 33 is disposed within a cylindrical cap 34. Terminals 26 and 27 extend downward through holes in a circular disk-shaped base portion (not shown) of PCB material. The circular edge of this disk-shaped base portion joins with the circular bottom edge of cap 34 and forms a circular bottom of starter unit 6.

Fluorescent lamp interface circuitry 29 includes a full wave rectifier 35 that receives a 230-volt alternating-current (AC) signal between terminals 26 and 27 and outputs a full wave rectified signal (VRECT) between nodes 36 and 37. Power switch 99 is the switch that is used to turn on, and to turn off, fluorescent lamp 4. Power switch 99 is a power field effect transistor (FET) that is controlled by microcontroller 30 via gate drive circuitry of circuitry 29. Microcontroller 30 drives the control electrode (the gate in this case) of switch 99 and controls and monitors the remainder of interface circuitry 29 via signals communicated across conductors 39. Microcontroller 30 monitors and traces the alternating current and voltage waveforms between nodes 36 and 37 using an analog-to-digital converter (ADC) that is part of the microcontroller. Microcontroller 30 monitors and traces the waveform of the current flowing through switch 99 by using its ADC to monitor a voltage dropped across a sense resistor 40. Microcontroller 30 uses an on-board comparator and a timer to detect and time zero-crossings and minima of the AC signals on nodes of the circuitry 29. Microcontroller 30 determines when and how to control switch 99 based on the detected voltage and current between nodes 36 and 37, the time of the zero-crossings of the AC signal on terminals 26 and 27, and the magnitude of current flowing through switch 99.

Power supply 28 receives the full wave rectified signal between nodes 36 and 37 and generates therefrom a direct current (DC) supply voltage VDD used to power microcontroller 30, RF transceiver 31, and interface circuitry 29. Power supply 28 includes a capacitance that is charged to the DC supply voltage VDD. This capacitance is large enough that it continues to power the microcontroller and RF transceiver of the starter unit for more than five seconds after the 230-volt AC power is removed from terminals 26 and 27. If the starter unit 6 is installed in light fixture 3, and if wall switch 13 is toggled on and off faster than once every five seconds, then interface circuitry 29, microcontroller 30, and transceiver 31 remain powered and operational.

Microcontroller 30 communicates with and controls RF transceiver 31 via a bidirectional serial SPI bus and serial bus conductors 42. In one embodiment, microcontroller 30 is a Z8F2480 8-bit microcontroller integrated circuit available from Zilog, Inc., 6800 Santa Teresa Blvd., San Jose, Calif. 95119. Microcontroller 30 includes an amount of non-volatile memory (FLASH memory) that can be written to and read from under software control during operation of starter unit 6. In one embodiment, RF transceiver 31 is a SX1211 transceiver integrated circuit available from Semtech Corporation, 200 Flynn Road, Camarillo, Calif. 93012. Transceiver 31 is coupled to antenna 32 via an impedance matching network 43 and a SAW filter 44 (see FIG. 6). The SAW filter may, for example, be a B3716 SAW filter available from the Surface Acoustic Wave Components Division of EPCOS AG, P.O. Box 801709, 81617 Munich, Germany. Antenna 32 may, for example, be a fifty ohm 0868AT43A0020 antenna available from Johanson Technology, Inc., 4001 Calle Tecate, Camarillo, Calif. 93012. RF transceiver 31 operates in a license free frequency band in the 863-878 MHz range (for example, about 868 MHz), in accordance with a reference design available from Semtech Corporation. The RF antenna and transceiver of starter unit 6 can receive an RF communication 16 (see FIG. 1) from master unit 2. The data payload of the communication 16 is communicated across SPI bus conductors 42 to microcontroller 30 for processing.

Figure 11:
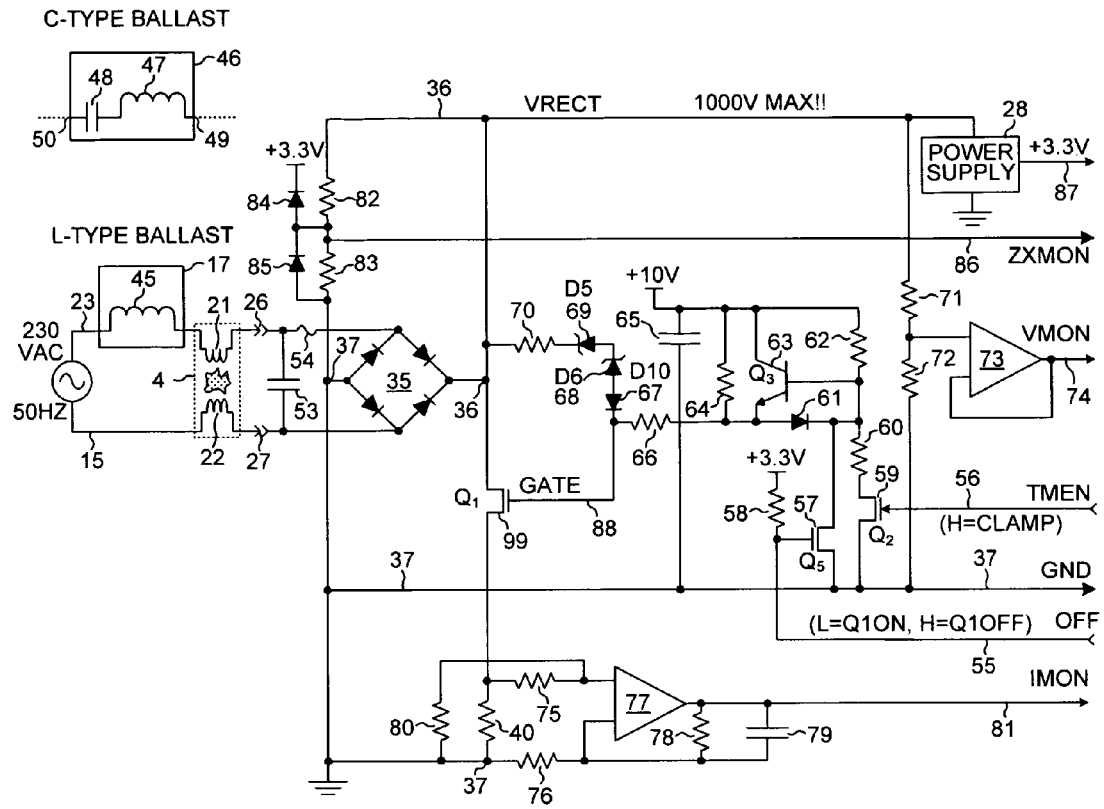
FIG. 11 is a circuit diagram of a first portion of the starter unit of FIG. 10.

FIG. 11 is a more detailed circuit diagram of starter unit 6. A 230-volt, 60-Hz alternating current (AC) mains voltage is present between conductors LINE conductor 23 and NEUTRAL conductor 15. L-type ballast 17 includes inductor 45 but no series capacitor, whereas the alternative C-type ballast 46 includes an inductor 47 and a series capacitor 48. If C-type ballast 46 were being used rather than L-type ballast 17, then terminal 49 of the ballast 46 would be connected to filament 21 of lamp 4 and terminal 50 would be connected to LINE conductor 23. A capacitor 51 is connected across terminals 26 and 27. Reference numeral 54 identifies a thermal fuse. AC voltage across terminals 26 and 27 is rectified by a full-wave rectifier 35 so that a rectified voltage signal RECT is present across nodes 36 and 37. Reference numeral 99 identifies the switch. The microcontroller 30 (see FIG. 12) can turn on and off this switch 99 by driving digital control signals OFF and TMEN onto conductors 55 and 56, respectively. Components 57-66 form a "voltage translation and gate drive circuit" for switch 99. Components 67-70 form a voltage clamp for clamping the gate voltage of switch 99. Signal TMEN being a digital high enables the voltage clamp. OFF being a digital high turns off switch 99. Microcontroller 30 monitors the voltage VRECT between nodes 36 and 37 using a voltage divider of resistors 71 and 72 and a voltage follower 73. The resulting signal VMON is directly proportional to VRECT and is supplied to the ADC on microcontroller 30 via conductor 74. Microcontroller 30 monitors the current flowing through switch 99 by monitoring the voltage drop across current sense resistor 40 using voltage detecting circuitry 75-80. The resulting voltage signal IMON has a magnitude that is directly proportion to the current flowing through switch 99. Signal IMON is supplied to the ADC on microcontroller 30 via conductor 81. Microcontroller 30 detects zero-crossings of the 230 volt AC signal indirectly via voltage divider, circuitry 82-85. The divided down voltage signal ZXMON is supplied to microcontroller 30 via conductor 86.

Power supply circuit 28 supplies a 3.3 volt DC power supply voltage to microcontroller 30 and to RF transceiver integrated circuit 31 via conductor 87.

Figure 12:
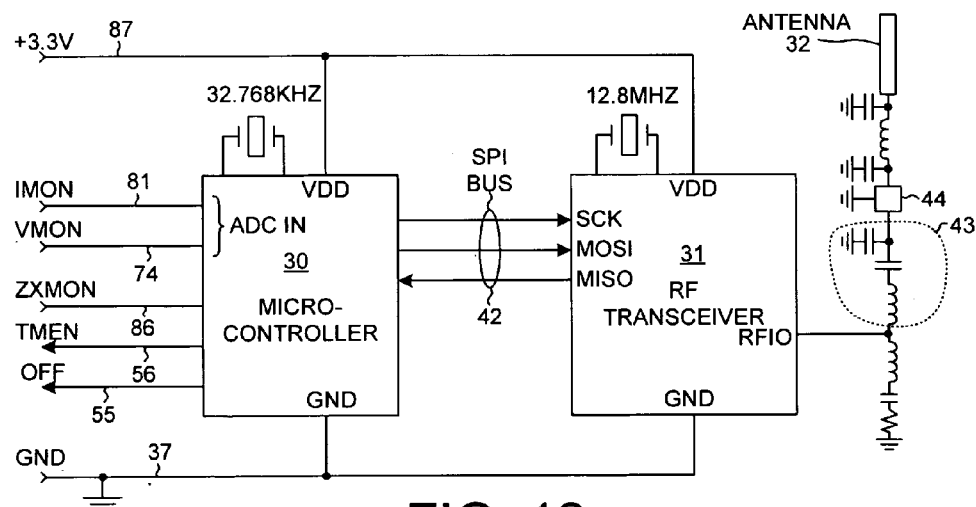
FIG. 12 is a circuit diagram of a second portion of the starter unit of FIG. 10.

FIG. 12 is a simplified circuit diagram that shows microcontroller 30 being interfaced, via SPI serial bus and conductors 42 to RF transceiver integrated circuit 31. The starter unit 6 can both receive and transmit RF signals via transceiver 31 and antenna 32.

In the turning off of fluorescent lamps using starter units, it has been recognized that when one of the two ballasts of a multi-lamp light fixture is of the L-type and the other of the two ballasts is of the C-type, that one of the two lamps may be turned off first. This may, for example, be due to the different type of turn off timing employed to turn off one lamp versus the other lamp. The first lamp may be turned off satisfactorily, but when the second lamp is then turned off then the on-state of the second lamp or the turn off of the second lamp may cause the first lamp to be ignited again. This may be due to electromagnetic interference from the second lamp turn off being received by the circuitry of the first lamp. In turn, in some cases, the first lamp being restarted may in turn cause the second lamp to be restarted at a later time. Regardless of the mechanism at work, a reliable solution to this problem is desired.

FIG. 13 is a waveform diagram that shows waveforms of signals in the turning off of a lamp using the starter unit 6 in a situation in which the ballast to which it is coupled is a C-type ballast. See for example, ballast 46 of FIG. 11 where the C-type ballast 46 is used rather than the L-type ballast 17. In the waveform diagram of FIG. 17, the signal ZXMON is the voltage signal on conductor 86, the signal GATE is the voltage signal on node 88 on the gate of transistor switch 99, the signal TMEN is the voltage clamp enable signal on conductor 56, and the signal IMON is the signal on conductor 81 that is proportional to the current flowing through switch 99. When the lamp 4 is to be turned off, the microcontroller 30 monitors the ZXMON signal to determine when a zero crossing of the AC mains signal occurs. The troughs 89-92 of the ZXMON signal indicate these times. At or slightly following one of the times, microcontroller 30 drives the digital signal OFF to a digital low. In the example of FIG. 13, this results in the gate signal GATE transitioning high at time T0 2.5 milliseconds after the zero crossing. Switch 99 is therefore turned on, and effectively shorts the nodes 36 and 37 across full-wave rectifier 35. The voltage ZXMON therefore falls to zero. The current through switch 99 as indicated by signal IMON in FIG. 13 rises and falls with a periodic wave shape that corresponds to a rectified sinusoidal wave shape because the AC signal supplied to the full-wave rectifier 35 input nodes is an AC signal. In the example of FIG. 13, the wave shape of the rectified sinusoid half-cycles of IMON are more pointed than the peaks of an ordinary rectified AC sinusoid.

Microcontroller 30 monitors the periodic IMON signal by taking ADC samples at a rate of about two hundred samples during the next twenty milliseconds. The microcontroller analyzes these samples to detect when the IMON signal reaches its minimum value at time T1 after having risen and fallen twice since time T0. Starting at time T1, microcontroller 30 waits a predetermined amount of time (for example, four milliseconds) and then initiates turn off of switch 99 by asserting the TMEN signal high at time T2. This causes the gate voltage on the gate of transistor 99 to decrease as illustrated such that transistor 99 begins operating in the linear mode. The high voltage VRECT on node 36 through clamp circuit 67-70 maintains the voltage on the gate of transistor 99 so that transistor 99 remains in the linear mode. VRECT decreases as energy drains from the ballast. When VRECT has decreased to a predetermined voltage (for example, 396 volts), then the clamp circuit 67-70 stops conducting current to node 88. The voltage on the gate of transistor 99 transitions to zero volts at time T3. This turns transistor 99 off. (The putting of switch 99 into the linear mode for a short amount of time so that shortly thereafter the gate voltage decreases to turn off the switch fully are sometimes generally referred to together as the turning "off" of the switch even though more properly considered the turn off operation actually involves a linear mode operation of short duration followed by switch turn off.)

FIG. 14 is a waveform diagram that shows waveforms of signals in the turning off of a lamp using the starter unit 6 in a situation in which the ballast to which it is coupled is an L-type ballast. See for example, ballast 17 of FIG. 11. Microcontroller 30 monitors ZXMON and determines when a zero crossing of the AC signal occurs. At or slightly following one of the times, microcontroller 30 drives the digital signal OFF to a digital low, thereby asserting the gate signal GATE on node 88 high at time T4. Switch 99 is turned on. The voltage ZXMON therefore falls to zero. The current through switch 99 as indicated by signal IMON in FIG. 14 rises and falls with a periodic wave shape that corresponds to a rectified sinusoidal wave shape. In the example of FIG. 14, the wave shape of the high peaks of IMON more closely resemble rectified sinusoid wave shapes than do the peaks in the waveform of FIG. 13.

Microcontroller 30 monitors the IMON wave by taking ADC samples and determines when the IMON signal reaches its minimum value at time T5 after having risen and fallen twice since time T4. Rather than waiting four milliseconds as in the example of FIG. 13, the microcontroller 30 asserts the TMEN signal high right away at time T6. In one example, the difference between times T1 and T2 in the situation of FIG. 13 is more than two milliseconds whereas the difference between times T5 and T6 in the situation of FIG. 14 is less than two milliseconds. The asserting of TMEN high causes the gate voltage on the gate of transistor 99 to decrease such that transistor 99 begins operating in the linear mode. The high voltage VRECT on node 36 through clamp circuit 67-70 maintains the voltage on the gate of transistor 99 so that transistor 99 remains in the linear mode. VRECT decreases as energy drains from the ballast. When VRECT has decreased to a predetermined voltage (for example, 396 volts), then the clamp circuit 67-70 stops conducting current to node 88. The voltage on the gate of transistor 99 transitions to zero volts at time T7. This turns transistor 99 off.

It has been found that using the turn off timing of FIG. 14 with L-type ballasts works better than does using the turn off timing of FIG. 13 with L-type ballasts. It has been found, however, that using the turn off timing of FIG. 14 with C-type ballasts can cause catastrophic failures of the switch transistor. If the switch 99 were to be controlled to begin turning off when the IMON signal was at its second minimum, then there would likely be too much energy remaining in the C-type ballast. When the switch is then put into its linear mode, the large amount of energy would overheat and destroy the switch transistor 99. The wait time between T1 and T2 in the timing of FIG. 13 is provided so that there will be less energy remaining in the ballast when switch 99 is put into the linear mode. Accordingly, the first type of timing is generally better for C-type ballasts and the second type of timing is generally better for L-type ballasts. To avoid the later turned-off lamp in a multi-lamp fixture from turning back on the other lamp that was just turned off, a method of using C-type timing to turn off both types of ballasts in a multi-lamp fixture has been used but sometimes the timing is such that lamps operating with L-type ballasts are not reliably turned off. Moreover, the starter unit does not have a way to determine if it is in a multi-lamp fixture or not, and therefore the L-type timing cannot be used even in situations in which the starter is not operating in a multi-lamp fixture.

Figure 15:
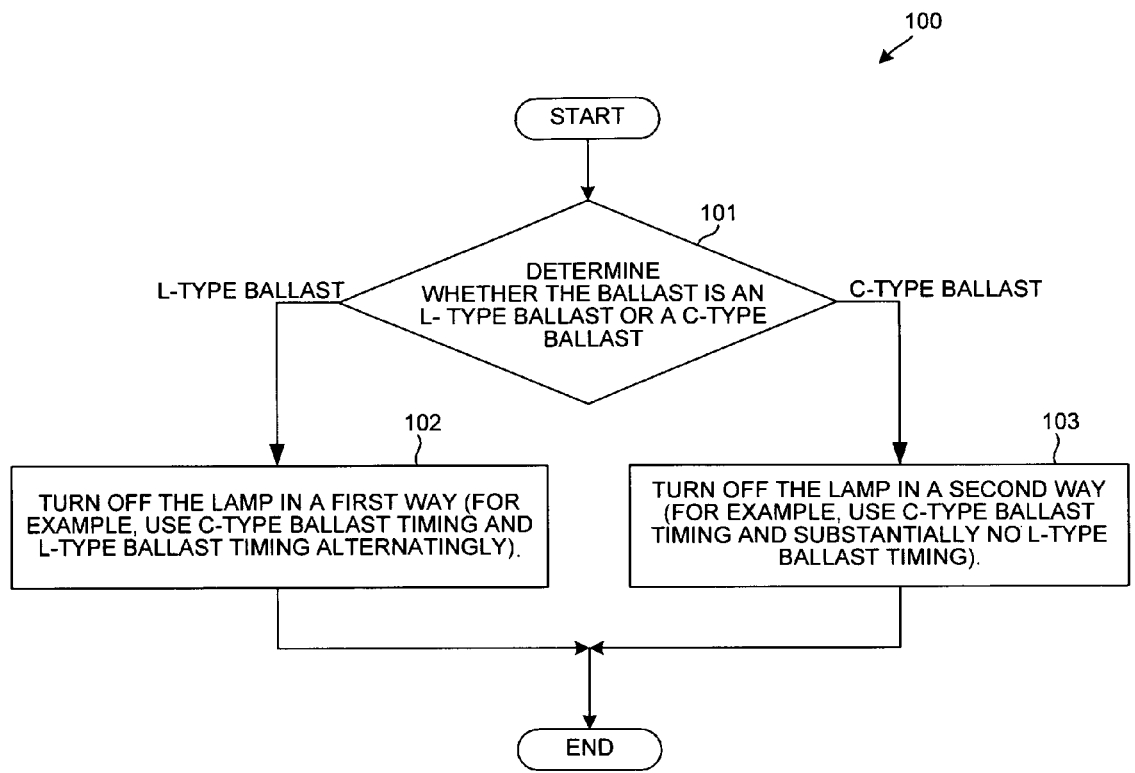
FIG. 15 is a flowchart of a method 100 in accordance with one novel aspect.

FIG. 15 is a flowchart of a method 100 in accordance with one novel aspect. In a first step (101), the starter unit makes a determination as to whether the ballast coupled to the starter unit is likely an L-type ballast or is likely a C-type ballast. In one example, this determination is made in a new way as set forth in connection with FIGS. 16 and 17. If the determination is that the ballast is likely an L-type ballast, then the lamp is turned off in a first way (step 102) in a subsequent turn off operation. This first way may involve performing a sequence of multiple turn off operations, using C-type timing and L-type timing alternatingly from turn off operation to turn off operation, starting with a C-type timing. Where a C-type timing is denoted "C" with a capital C, and where an L-type timing is denoted "L" with a capital L, the pattern of timings used in a sequence of turn off operations may be a mix of timings such as "CLCCLCLC" for a number of attempts. If the lamp is not successfully extinguished, then the pattern may switch to another pattern, for example "CLCCCCCC". The patterns are read left to right.

If, however, the determination in step 101 is that the ballast is likely a C-type ballast, then the lamp is turned off in a second way (step 103) in a subsequent turn off operation. This second way may involve performing a sequence of multiple turn off operations using C-type timing and substantially no L-type timing. By not using L-type timing, the risk of using L-type timing in combination with a C-type ballast and thereby destroying switch 99 in the starter unit is avoided. The pattern of timings used in a sequence of turn off operations may be designated "CCCCCCCC".

Accordingly, if a C-type ballast and an L-type ballast are both provided in a multi-lamp fixture, then there will be times when attempts are being made to turn off both lamps of the multi-lamp fixture using the same C-type timing. The simultaneous turn off of both lamps reduces to incidence of a later turn off operation from re-igniting a previously turned off lamp. Also, in the event a lamp coupled to an L-type ballast is not turned off using the weaker C-type timing, there will be a time when at attempt is made to turn off that lamp using L-type timing. The same method 100 is carried out in a starter unit, regardless of whether the starter unit is employed in a multi-lamp light fixture or is employed in a single-lamp light fixture.

Figure 16:
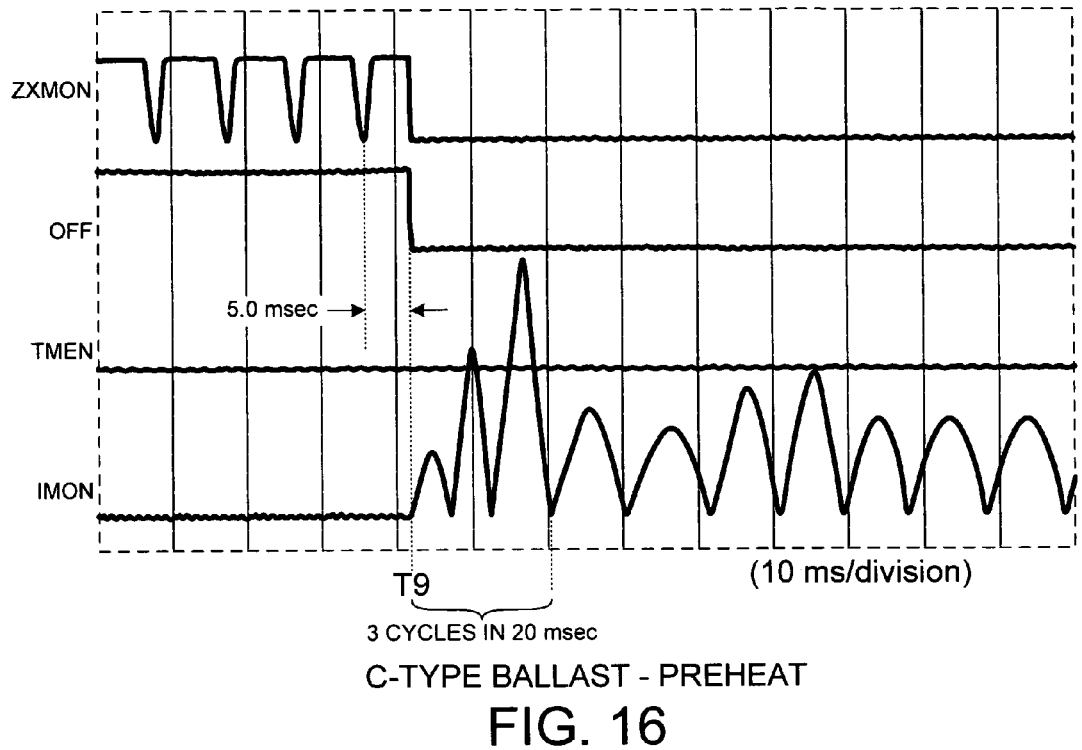
FIG. 16 is a waveform diagram of a transient response due to a C-type ballast. The starter unit detects this transient response and analyzes it and thereby determines that the starter unit is likely coupled to a C-type ballast.
Figure 17:
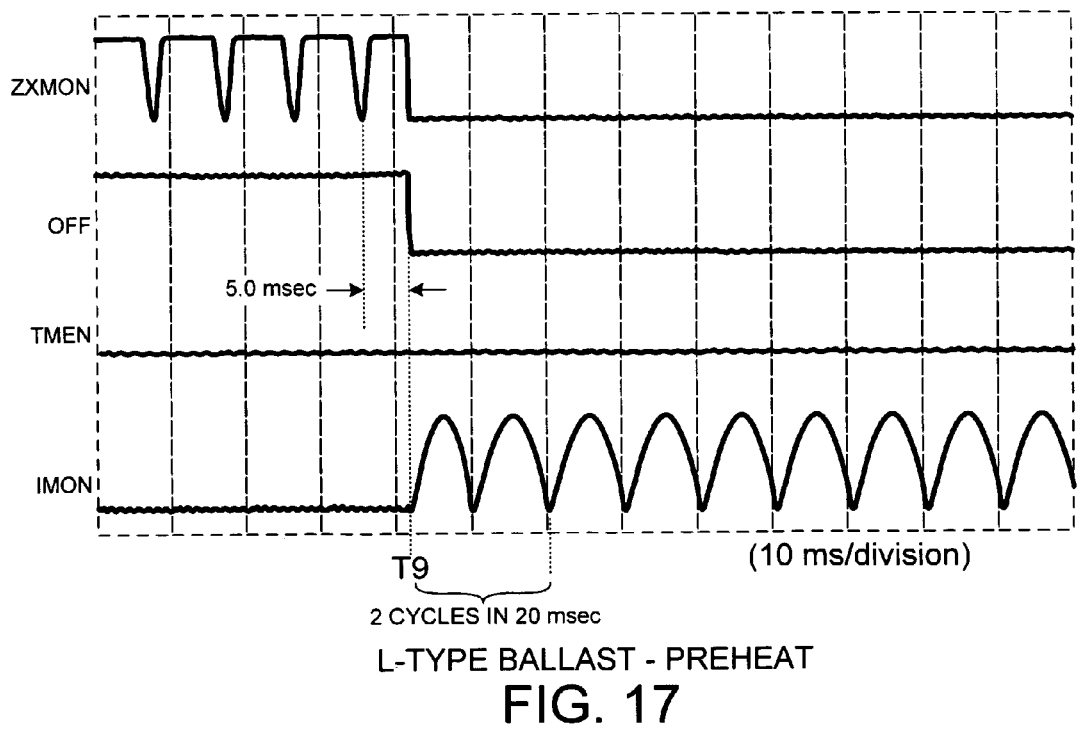
FIG. 17 is a waveform diagram of a transient response due to an L-type ballast. The starter unit detects this transient response and analyzes it and thereby determines that the starter unit is likely coupled to an L-type ballast.

FIGS. 16 and 17 are waveform diagrams that illustrate a novel way that the determination of the type of ballast can be made in step 101. Previously in the art attempts were made to determine ballast type based on differences in the saddle portion of the wave shape of the ZXMON signal. In FIG. 13, for example, notice that between troughs 89 and 90 the ZXMON wave shape has more of a saddle than does the ZXMON signal in FIG. 14. The differences between the high voltage during this saddle time and the low voltage during this saddle time was used in an attempt to detect whether the ballast was an C-type ballast or an L-type ballast, but this previously used method was unreliable.

In the novel method set forth in FIGS. 16 and 17, the saddle shape of the ZXMON signal is not used but rather the periodicity of the IMON signal is detected and used as an indicator of the ballast type. The different ballast types are used to affect power factor and therefore the ballasts typically have different natural harmonic oscillating frequencies. In general, the capacitor of the C-type ballast is not small and has a fixed relationship with respect to the inductance L of the ballast for a given AC power signal frequency. For example, in a fifty hertz example for a 36 watt lamp, the inductance of the inductor in the C-type ballast may be 3.4 microhenrys and the series capacitance in the C-type ballast may be 3.4 microfarads. But regardless of the reason, the transient oscillatory response of current flow through the ballast and lamp back into the starter unit as a result of switching on of switch 99 is seen to differ depending on whether a C-type ballast is used or whether an L-type ballast is used. The magnitude of the period of the transient response is related to the natural oscillating frequency of the ballast, and is therefore indicative of whether the ballast is a C-type ballast or an L-type ballast.

FIG. 16 is a waveform diagram that shows the transient response of IMON that is detected by microcontroller 30 to determine that the ballast is likely a C-type ballast. In a preheat operation, the switch 99 is turned on as a result of the signal OFF transitioning low at time T8. Switch 99 is turned on so that current flows through the full-wave rectifier 35. Three rectified sinusoidal wave shapes are then seen in the IMON signal over the next twenty milliseconds as illustrated. This is a transient response and over time the period of the IMON signal settles to match the fifty hertz forced response due to the starter unit being driven with a fifty hertz AC signal. Microcontroller 30, however, monitors the IMON signal during the first twenty milliseconds. If it detects a first periodicity of IMON (for example, more than two pulses of IMON during this twenty millisecond time as illustrated in FIG. 16) then it determines that the ballast is likely a C-type ballast.

FIG. 17 is a waveform diagram that shows the transient response of the IMON signal that is detected by microcontroller 30 to determine that the ballast is likely an L-type ballast. In the preheat operation, the switch 99 is turned on at time T9. Microcontroller 30 monitors the IMON signal and if it detects a second periodicity of the IMON signal (for example, two pulses of IMON during the next twenty millisecond time) then microcontroller 30 determines that the ballast is likely an L-type ballast. Although the determining of the periodicity of the transient response is described here as occurring in a preheat cycle, this is just an example. The determination of the periodicity of the transient response may be performed at other times such as in response to the turning on of switch 99 during a lamp turn on or turn off operation. It is to be understood that the description of the operation of the fluorescent lamp light fixture and starter unit is a simplification. For a more detailed and accurate description and understanding, the actual detailed circuit can be built and/or simulated using a circuit simulator such as SPICE.

For additional details on how starter units turn off fluorescent lamps without using a wall switch and for details on RF-enabled starter units in a lighting system, see: 1) U.S. patent application Ser. No. 12/587,152 entitled "Registering A Replaceable RF-Enabled Fluorescent Lamp Starter Unit To A Master Unit," filed on Oct. 1, 2009, 2) U.S. patent application Ser. No. 12/587,130 entitled "Turning Off Multiple Fluorescent Lamps Simultaneously Using RF-Enabled Lamp Starter Units," filed on Oct. 3, 2009, 3) U.S. patent application Ser. No. 12/587,169 entitled "Dimming A Multi-Lamp Fluorescent Light Fixture By Turning Off An Individual Lamp Using A Wireless Fluorescent Lamp Starter," filed on Oct. 3, 2009, and 4) U.S. patent application Ser. No. 12/802,090 entitled "Rejecting Noise Transients While Turning Off A Fluorescent Lamp Using A Starter Unit," filed on May 28, 2010, by Kamlapati Khalsa and Roger Ball, (The subject matter of all four patent documents is incorporated herein by reference).

Hot Socket Insert Ballast Type Detection: There may be a requirement sometimes referred to as a "hot socket insert"

requirement imposed on the starter unit whereby a starter unit in a functioning lighting fixture whose fluorescent lamp is on and hot is to be removed from the lighting fixture, and a second starter unit is then to be plugged into the lighting fixture such that the fluorescent lamp is to remain on. The newly inserted second starter unit is to operate thereafter in the lighting fixture as if it had been plugged into and installed in the lighting fixture when the lamp was off and cold.

Described above are methods for detecting ballast type by detecting a periodicity of the IMON signal during an initial portion of a preheat operation. FIG. 16 illustrates a waveform of an IMON signal during a preheat operation when the lighting fixture involves a C-type ballast. FIG. 17 illustrates a waveform of the IMON signal during a preheat operation when the lighting fixture involves an L-type ballast. Although the periodicity difference in the IMON signal is usable to detect ballast type in an ordinary preheat operation when the lighting fixture and lamp are in an off state, there may be problems with using the periodicity of the IMON signal to determine ballast type when the lighting fixture and lamp are in an on state. The same periodicity difference between the waveforms of FIG. 16 and FIG. 17 may not occur if such a preheat operation were to be performed on a lighting fixture whose lamp is on. Accordingly, in accordance with one novel aspect, the starter unit uses a first method to determine ballast type in a situation in which the lamp of the lighting fixture is off whereas the starter unit uses a second method to determine ballast type in a hot socket insert situation in which the lamp is on.

Figure 18:
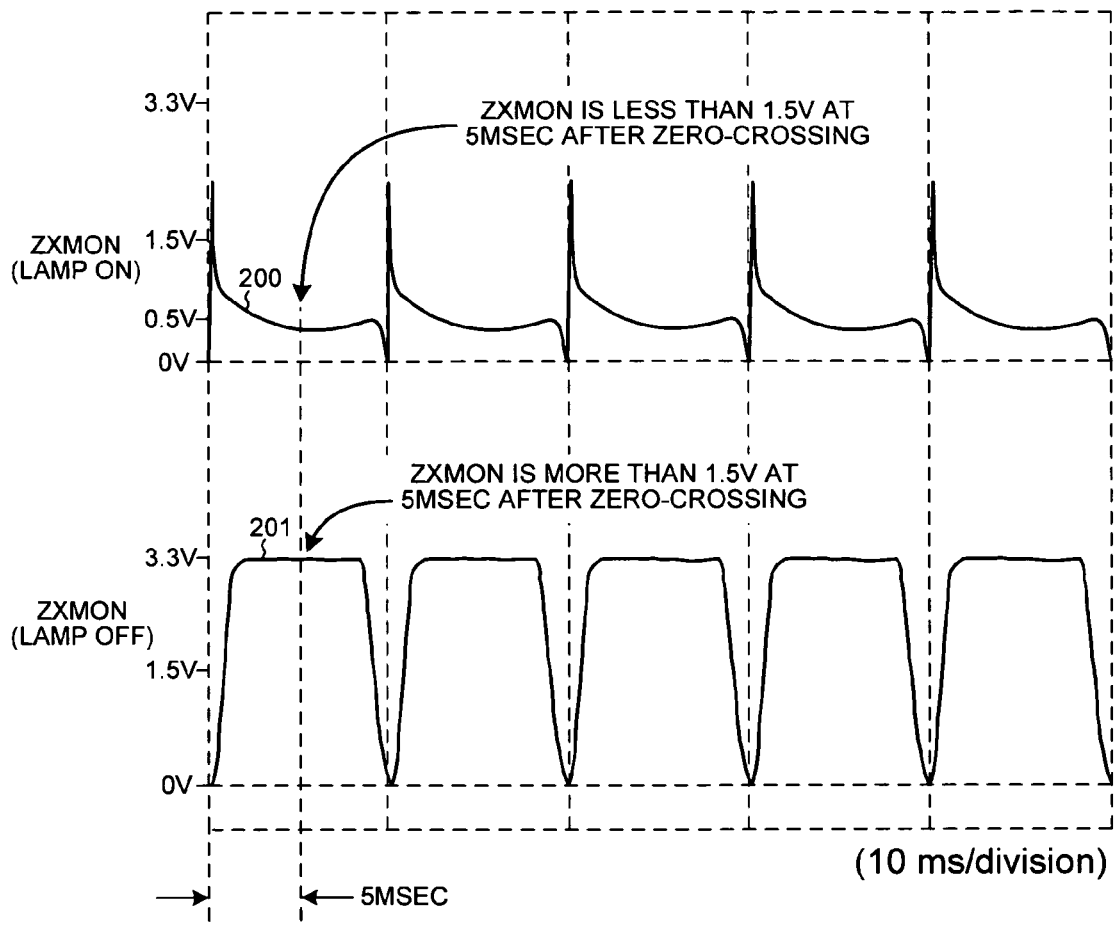
FIG. 18 is a waveform diagram that shows how the shape of the zero-crossing signal differs depending on whether the lamp is on or off.

FIG. 18 is a waveform diagram that shows the shape of the zero-crossing signal ZXMON in a condition in which the lamp is on (upper waveform 200) and in a condition in which the lamp is off (lower waveform 201). The differences between these two wave shapes is usable by the starter unit to determine whether the starter unit is in a hot socket insert situation.

Figure 19:
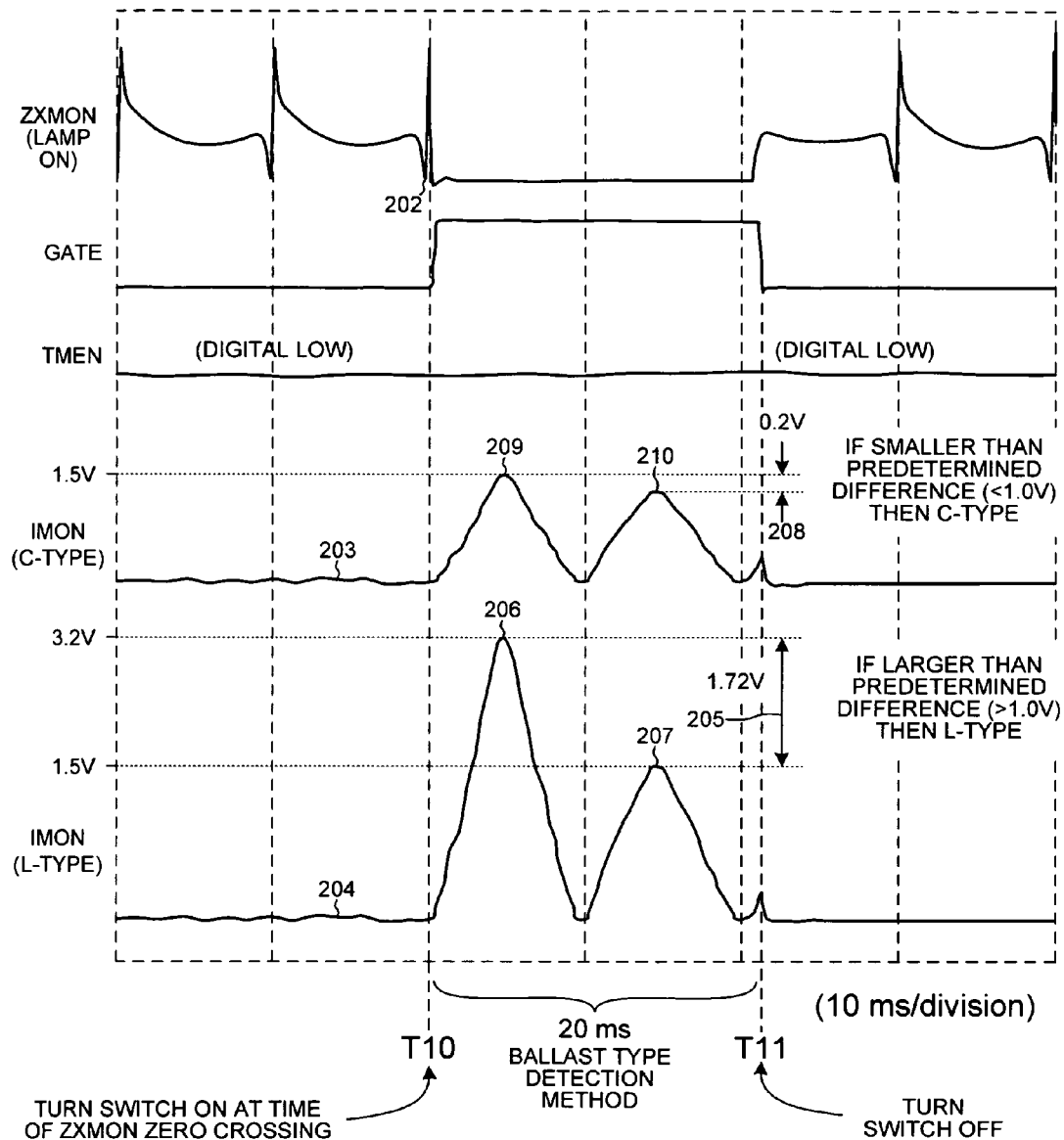
FIG. 19 is a waveform diagram of a hot socket insert ballast type detection method.

FIG. 19 is a waveform diagram associated with the second method of determining ballast type in a hot socket insert situation. The power switch 99 is turned on for a short amount of time (twenty milliseconds from T10 to T11) without turning on the voltage clamp (voltage clamp control signal TMEN is low and remains low). Rather than waiting an amount of time after the zero-crossing 202 to turn the power switch 99 on as is shown in the waveforms of FIG. 16 and FIG. 17, the power switch 99 is turned on at or substantially at the time T10 of the zero-crossing 202 as indicated in the waveforms of FIG. 19. The IMON signal has the wave shape indicated by waveform 203 if the ballast is a C-type ballast whereas the IMON signal has the wave shape indicated by waveform 204 if the ballast is an L-type ballast. Note that in this hot socket situation the periodicity of both waveforms 203 and 204 is the same or approximately the same for both ballast types, but the relative peak heights of the first and second peaks is quite different depending on ballast type. In the case of an L-type ballast, there is a substantial relative difference 205 in the height of the first and second peaks 206 and 207 of the IMON signal, whereas in the case of a C-type ballast there less of a relative difference 208 between the first and second peaks 209 and 210. The relative difference in the peak heights of the first and second peaks is therefore used to determine ballast type in a hot socket insert situation. The ADC of the microcontroller within the starter unit samples the IMON signal (at a rate of approximately two hundred samples in twenty milliseconds) to detect the amplitudes of the IMON signal peaks.

Figure 20:
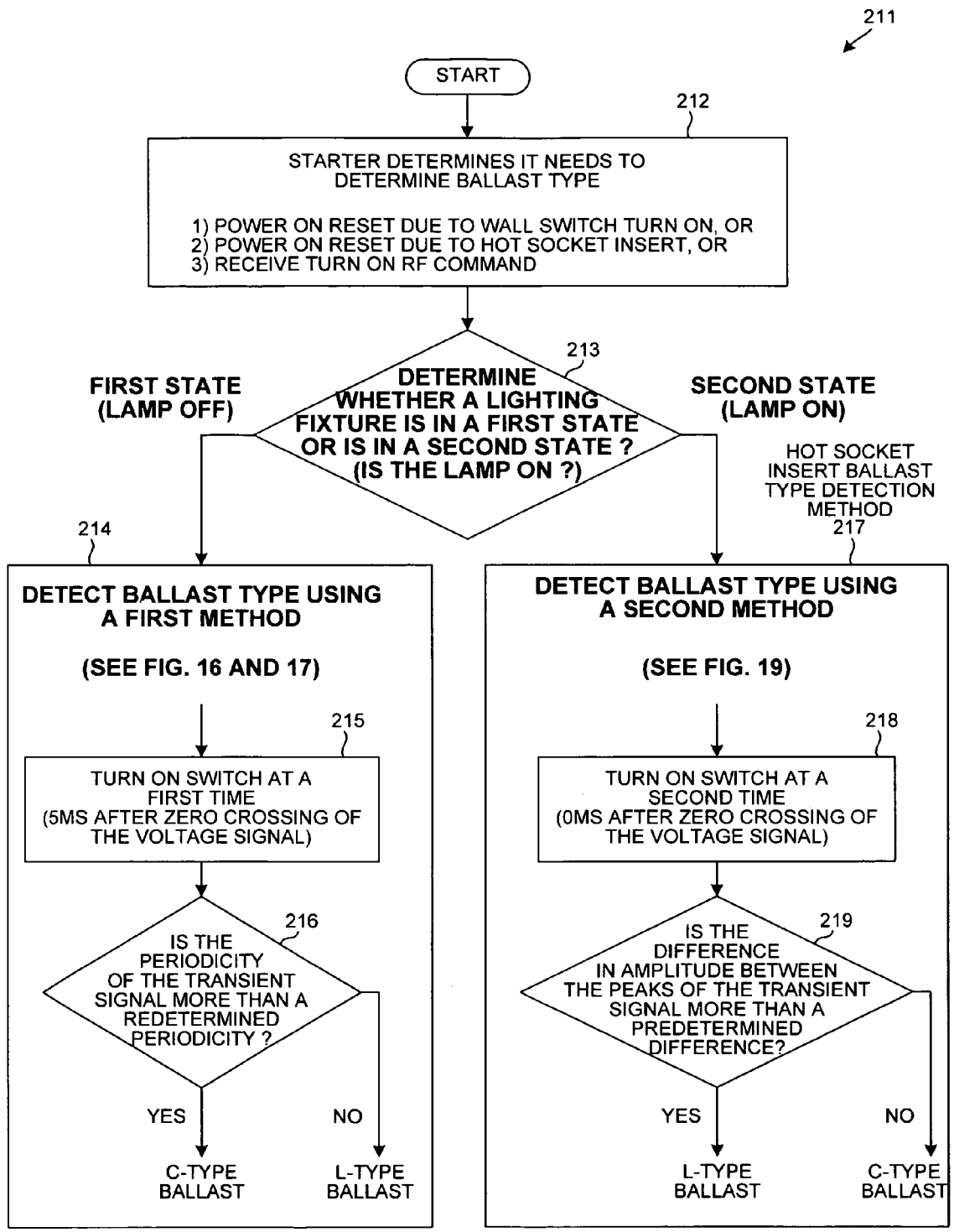
FIG. 20 is a flowchart of a method in which a first method is used to determine ballast type in a situation in which a lighting fixture is in a first state (for example, the lamp is off and cold) whereas a second method is used to determine ballast type in a situation in which the lighting fixture is in a second state (for example, the lamp is on and hot).

FIG. 20 is a flowchart of a method 211 in which a first method is used to determine ballast type in a situation in which the lighting fixture is in a first state (for example, the lamp is off and cold) whereas a second method is used to determine ballast type in a situation in which the lighting fixture is in a second state (for example, the lamp is on and hot). In a first step (step 212), the starter unit determines it needs to determine ballast type. Examples of conditions that may cause the starter unit to determine that it needs to determine ballast type include: 1) the starter unit experiences a power on reset condition due to the wall switch being turned on, 2) the starter unit experiences a power on reset condition due to a hot socket insert situation, and 3) the starter unit receives an command (for example, an incoming RF command) that instructs the starter unit to determine ballast type.

The starter unit then determines (step 213) whether the lighting fixture is in the first state (for example, the lamp is off and cold) or if the lighting fixture is in the second state (for example, the lamp is on and hot). In one example, the starter unit makes this determination by detecting the magnitude of the ZXMON zero-crossing signal at a time five milliseconds after the zero-crossing time. As indicated in FIG. 18, if the ZXMON zero-crossing signal has a voltage magnitude more than 1.5 volts (see the lower waveform 201) then it is determined that the lamp is off (the lighting fixture is in the first state), whereas if the ZXMON zero-crossing has a voltage magnitude less than 1.5 volts (see the upper waveform 200) then it is determined that the lamp is on (the lighting fixture is in the second state).

If the determination (step 213) is that the lighting fixture is in the first state, then the starter unit detects ballast type using a first method (step 214). In one example of the first method, the periodicity of the IMON signal is used to determine ballast type as indicated in FIGS. 16 and 17. Power switch 99 is turned on (step 215) at a first time (approximately five milliseconds after the zero-crossing of ZXMON). If the periodicity of the transient IMON signal is determined (step 216) to be more than a predetermined amount (for example, more than two peaks are detected in twenty milliseconds) then the ballast is determined to be a C-type ballast, whereas if the periodicity of the transient IMON signal is determined (step 216) not to be more than the predetermined amount then the ballast is determined to be an L-type ballast.

If the determination (step 213) is that the lighting fixture is in the second state, then the starter unit detects ballast type using a second method (step 217). Whereas the first method primarily uses a detected periodicity of the transient IMON signal to determine ballast type, the second method primarily uses other information about a peak or peaks (such as peak amplitude information) of the transient IMON signal to determine ballast type.

In one example of the second method, the relative difference in amplitude between the first two peaks of the transient IMON signal is used to determined ballast type as indicated in FIG. 19. The power switch is turned on (step 218) at a second time (approximately zero milliseconds after the zero-crossing of ZXMON). If the difference in amplitude between the first two peaks of the transient IMON signal is determined (step 219) to be more than a predetermined amount (for example, more than 1.0 volts) then the ballast is determined to be an L-type ballast, whereas if the difference in amplitude between the first two peaks of the transient IMON signal is determined (step 219) not to be more than the predetermined amount then the ballast is determined to be a C-type ballast. In the second method the power switch is turned on at the time of the zero-crossing rather than five milliseconds after the time of the zero-crossing because turning the power switch on five milliseconds after the time of the zero-crossing can distort the IMON peaks in unwanted ways such that the second method (involving peak amplitude detection) is rendered unreliable.

Implementation of the control and decision-making method 211 depicted in FIG. 20 involves a set of processor-executable instructions stored in processor readable memory (in this case FLASH memory) in microcontroller 30 in starter unit 6. The processor of microcontroller 30 executes the set of instructions, thereby causing the various steps of the method 211 to be carried out.

Figure 21:
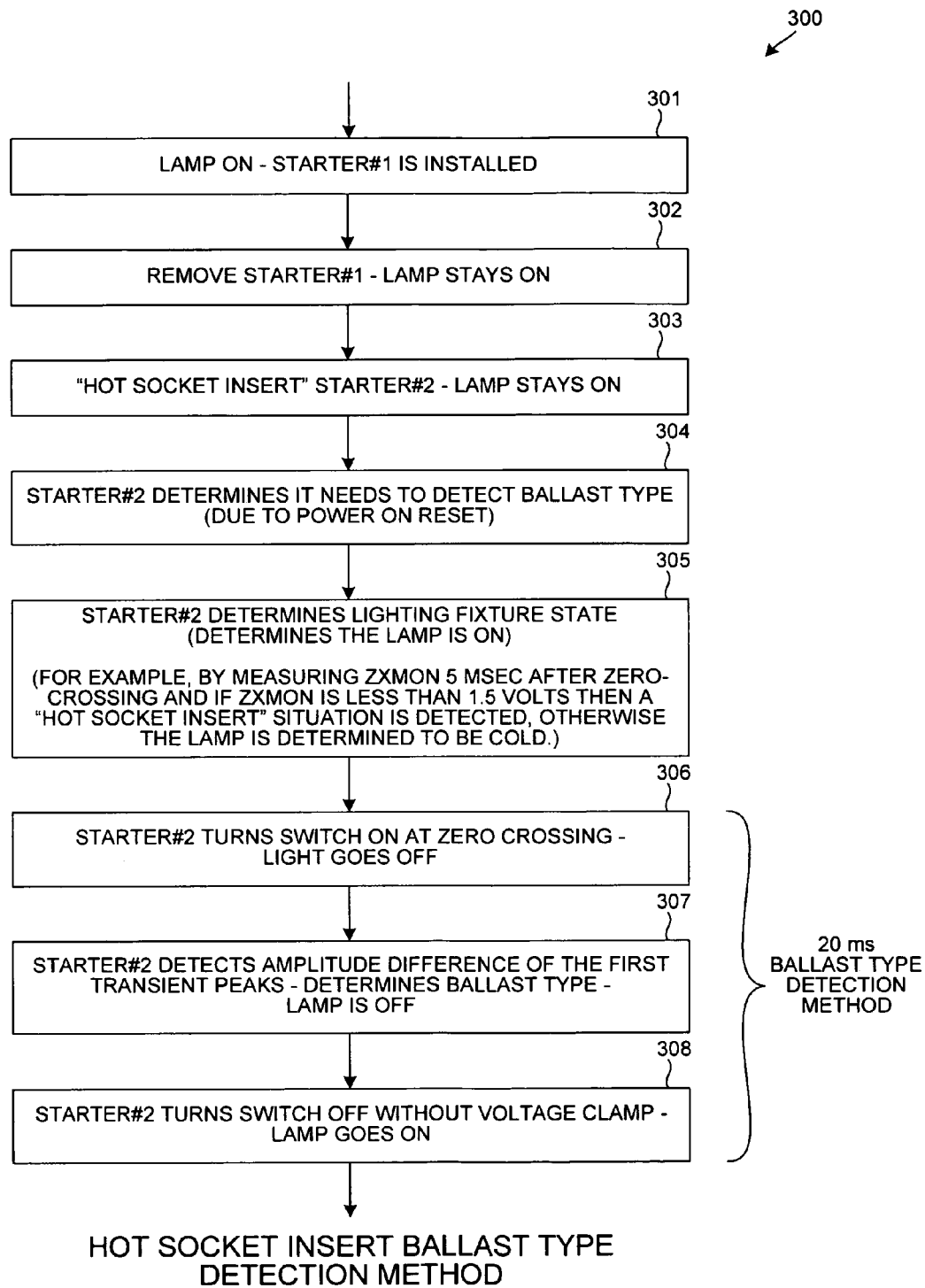
FIG. 21 is a flowchart of a method involving a hot socket insert situation.

FIG. 21 is a flowchart of a method 300 involving a hot socket insert situation. Initially (step 301), the lamp of the lighting fixture is on and a first replaceable starter unit is installed in the lighting fixture. Next (step 302), a user unplugs and removes the first starter unit from the lighting fixture during a time when the lamp is on. The lamp stays on even after the first starter unit has been removed. Next (step 303), a second replaceable starter unit is plugged into the lighting fixture in what is called a "hot socket insert". The lamp continues to remain on. Due to being plugged into the lighting fixture, the second starter unit experiences a power on reset condition. As a consequence of powering up, the second starter unit determines (step 304) that it needs to determine ballast type. The second starter unit then determines (step 305) lighting fixture state (determines that whether the lamp is on or is off) by measuring the magnitude of the zero-crossing voltage signal ZXMON at a time five milliseconds after a zero-crossing. In this example, ZXMON is measured to be less than 1.5 volts and the lighting fixture is determined to be in the second state (lamp is on). The second starter unit then uses a ballast type detection method appropriate for detecting ballast type in a hot socket insert condition. Had the second starter unit determined that the lighting fixture was in the first state (lamp is off), then the second starter would have selected a ballast type detection method appropriate for detecting ballast type in a condition of the lamp being off.

Next (step 306), the second starter unit turns the power switch 99 on approximately at the time of the zero-crossing (see time T10 in FIG. 19) and the lamp is extinguished. The voltage clamp circuit of the second starter unit is, however, not enabled. The second starter unit then uses peak amplitude information of the IMON signal to determine ballast type. There are many ways the starter unit can do this. In one example, the second starter unit determines the difference in amplitude between the amplitude of the first peak of IMON and the amplitude of the second peak of IMON. If the difference is more than a predetermined amount, then the lighting fixture is determined to involve an L-type ballast otherwise the lighting fixture is determined to involve a C-type ballast. The second starter unit then turns the power switch off (step 308) without activating the voltage clamp such that the lamp is re-ignited. The ballast type determining method from steps 303 to 308 takes only a small amount of time such as approximately twenty milliseconds to complete. The lamp is only off during this small amount of time.

The determined information about ballast type is then usable by the second starter unit in the event the starter unit is later called upon to turn the lamp off. In a lamp turn off operation, as described above, the voltage clamp circuit is used. In a lamp turn off operation, if the switch is turned off at the wrong time when the lighting fixture involves a C-type ballast, so much energy may be discharged through the switch in such a short amount of time that the starter may be damaged. The determined information about ballast type is usable to select the appropriate turn off timing of either FIG. 13 or FIG. 14 so that satisfactory lamp turn off occurs without damaging the starter unit.

Smart Clamp: In the circuit of FIG. 11, consider a situation in which the lamp 4 is initially on (OFF=H, TMEN=L) and then the lamp 4 is to be turned off. Signal OFF is made to transition low. Transistor Q5 is therefore made non-conductive so that transistor Q5 no longer pulls the gate voltage of the main switch transistor Q1 low, and so that the "voltage translation and gate drive circuit" 109 can then raise the gate voltage to +10 volts, thereby turning on transistor Q1. Transistor Q1 being on provides a low resistance current path between terminals 26 and 27. The lamp 4 is connected across these terminals 26 and 27, so transistor Q1 being on reduces the voltage across the lamp such that the current path through the lamp is extinguished. After an amount of time (about 20 milliseconds as described above in detail above), transistor Q1 is to be turned off. If the clamp circuit 67-70 were not present, then at the time of the turn off of transistor Q1 the energy stored in the inductance of ballast 17 would manifest itself in a voltage spike on VRECT node 36. This high voltage would likely reignite the lamp, which in turn would create a low impedance path through the lamp, and the lamp would thereafter remain on due to the transistor Q1 being off. The turn off operation would therefore not work.

Clamp circuit 67-70 is therefore enabled for the remainder of the turn off cycle by setting signal TMEN high (while OFF is still low). Setting TMEN high establishes a current path to ground. If there where no current flow through zener diodes 68 and 69, then the pull down effect of transistor Q2 on the "voltage translation and gate drive circuit" 109 would set the voltage on the gate of transistor Q1 to be approximately 0.5 volts. This voltage is low and would result in transistor Q1 being off. The reduced conduction through transistor Q1 due to signal TMEN being high will cause the inductor to discharge to some extent, but as the voltage VRECT increases, the voltage VRECT will soon exceed 360 volts. At a VRECT of 360 volts, the zener diodes 68 and 69 conduct current from VRECT node 36, through resistor 70, through zener diode 69, through zener diode 68, through signal diode 67 and to node 88 at the gate of transistor Q1. A current path is therefore established from node 36, through the zener diodes to node 88, and from node 88, through resistor 66, through diode 61, and through conductive transistor Q2 to ground node 37. There is a voltage dividing effect from the VRECT voltage on node 36 to node 88, and from node 88 to ground potential on node 37 due to the voltage drop across components 67-70 and due to the voltage drop across components 66, 61, 60 and 59. This voltage dividing effect causes the voltage on the gate of transistor Q1 to be raised (raised to 5.0 volts) so that transistor Q1 is biased to in its linear region. Further increases in the voltage VRECT (above a VRECT voltage of 360 volts) cause further increases in the gate voltage of transistor Q1 due to this voltage dividing effect, and therefore cause transistor Q1 to be made more conductive. The clamp circuit 67-70 is therefore a self-regulating circuit in that the higher VRECT is, the more conductive transistor Q1 is made to be.

When the ballast 17 has discharged to the point that the voltage on VRECT node 36 decreases to below 360 volts, then zener diodes 68 and 69 stop conducting current. With transistor Q2 being conductive, the "voltage translation and gate drive circuit" 109 holds the gate voltage of transistor Q1 low at 0.5 volts. The transistor Q1 is then off. This condition (Q1 is off) persists from the time current flow through the zener diodes stops until the end of the turn off cycle, at which time signal TMEN is made to transition low (Q2 is turned off) and signal OFF is made to transition high (Q5 is turned on). Setting signal TMEN low, and setting signal OFF high, causes the voltage on the gate of transistor Q1 to be pulled low to about 0.5 volts (approximately zero volts) and turns off transistor Q1.

In normal lamp operation, when the lamp is off, the lamp is not reducing the voltage between conductors 26 and 27. In this condition, the full value of the rectified 230 VAC mains voltage is present on node VRECT. The AC mains voltage is 230 VAC RMS plus or minus ten percent. 230 VAC RMS plus ten percent translates to 253 VAC RMS. A 253 VAC RMS signal has a peak voltage of approximately 358 volts. Accordingly, when the lamp is off, VRECT can be expected to be as high as 358 volts. It is desired that there is no leakage through the zener diodes and transistor Q5 in this condition when the lamp is off. The zener diode voltage drop (across zener 69, zener 68, and diode 67) is therefore set to be slightly higher than 358 volts at 360 volts. Setting the zener diode voltage drop at 360 volts prevents the zener diodes from conducting and affecting the voltage on the gate of transistor Q1 for VRECT voltages of 360 volts or less. If there is no conduction through the zener diodes, then the combination of conductive pulldown transistor Q2 and "voltage translation and gate drive circuit" 109 sets the gate voltage of transistor Q1 at 0.5 volts. Transistor Q1 is therefore off for the final part of the turn off cycle when VRECT is below 360 volts.

It has been recognized, however, that some lamps will re-ignite if VRECT is allowed to reach 360 volts. Because the clamp stops clamping when VRECT falls to 360 volts, it is possible in the circuit of FIG. 11 that VRECT will be 360 volts when the clamping action stops such that the lamp may re-ignite.

Figure 22:
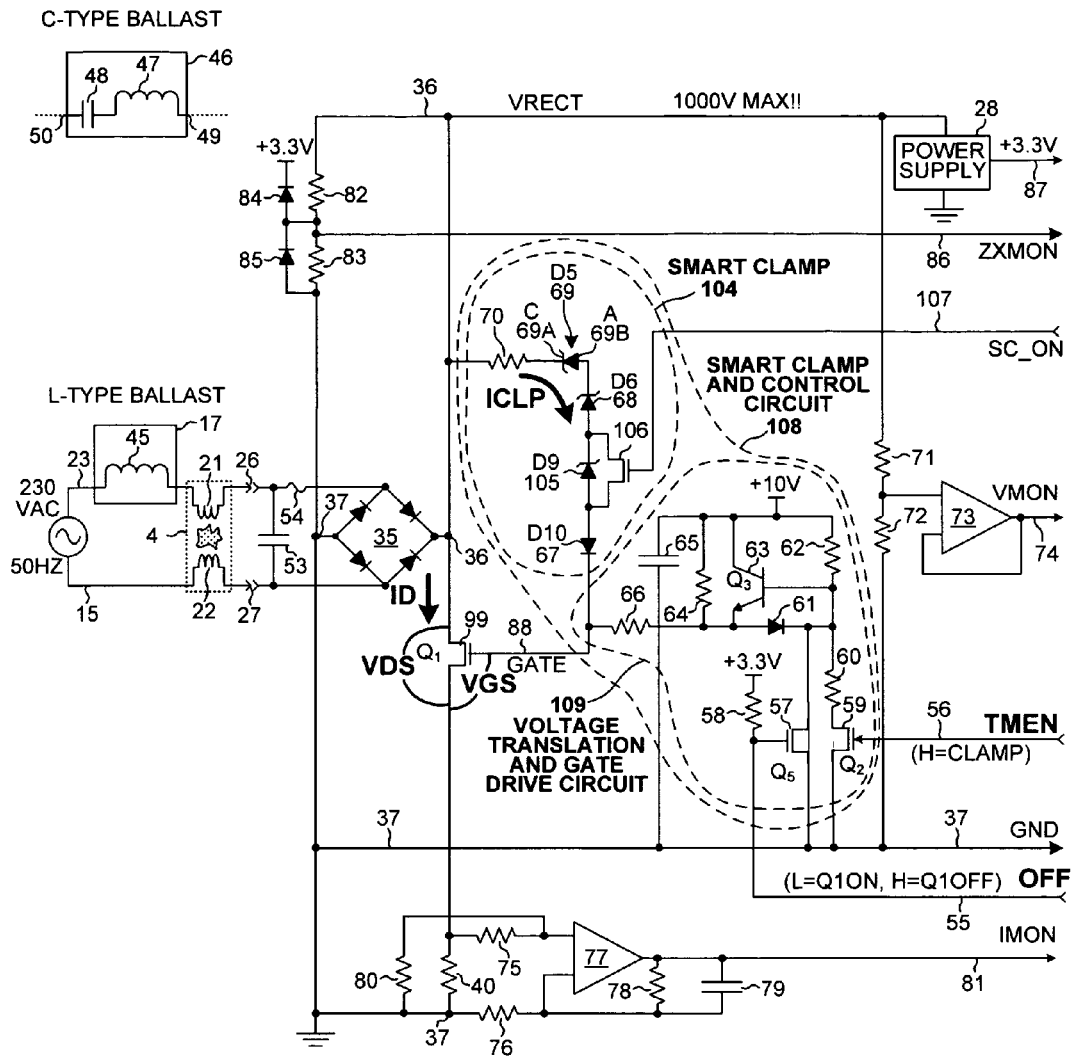
FIG. 22 is a circuit diagram of the first portion of the starter unit of FIG. 10 in a second embodiment in which the first portion includes a "smart clamp".

FIG. 22 is a circuit diagram of the first portion of the starter unit of FIG. 10. The circuit of FIG. 22 is like the circuit of FIG. 11, except that the circuit of FIG. 22 includes a different clamping circuit (referred to here as a "smart clamp") and an associated control signal SC_ON conductor and control functionality in the microcontroller. The smart clamp circuit 104 includes resistor 70, zener diode 69, zener diode 68, zener diode 105, signal diode 67, signal transistor 106, and control conductor 107, as well as control functionality in microcontroller 30 of FIG. 12. Components 70, 69, 68, 105 and 67 are coupled together in series as illustrated, with signal transistor 106 being coupled in parallel with zener diode 105. Control conductor 107 extends to a digital output terminal (not shown) of microcontroller 30 of FIG. 12 so that the microcontroller 30 can turn on and off transistor 106 under software control.

In the present example, resistor 70 has a resistance of 94 k ohms; zener diode 69 has a breakdown voltage of 180 volts (ISMA180Z with 5% tolerance, 1.25 Watts); zener diode 68 has a breakdown voltage of 130 volts (ISMA130Z with 5% tolerance, 1.25 Watts); zener diode 105 has a breakdown voltage of 50 volts; diode 67 is a small signal diode (FDLL4148); resistor 66 has a resistance of 47 ohms; resistor 60 has a resistance of 15 k ohms; transistor Q2 is a 2N7002 MOS transistor; diode 61 is a small signal diode FDLL4148; and transistor Q1 is a FQB4N90 N-channel MOS transistor. The values of the resistances of resistors 70, 66 and 60 are determined by assuming VRECT on one end of the voltage divider (at node 36) is 396 volts, and assuming ground potential is on the other end of the voltage divider (at node 37), and determining the resistances such that 5.0 volts will be present on node 88 (assuming transistor Q2 is a short to ground potential and assuming transistor Q5 is off).

When smart clamp circuit 104 is enabled (in the second portion of the lamp turn off cycle), the digital control signal SC_ON transitions high at the same time that digital control signal TMEN transitions high. Similarly, at the end of the lamp turn off cycle, the signal SC_ON transitions low at the same time that signal TMEN transitions low. Accordingly, during the time the smart clamp circuit 104 is enabled, the zener diodes 69 and 68 will conduct current from node 36 (VRECT) when there is a voltage drop of 310 volts or more across these diodes (when VDS of transistor Q1 is greater than 310 volts). Such a clamp current ICLP will flow in a current path from node 37, through resistor 70 to the cathode (C) 69A of zener diode 69, through zener diode 69, and from the anode (A) 69B of zener diode 69 to the cathode of zener diode 68, through zener diode 68, and from the anode of zener diode 68 to the drain of N-channel signal transistor 106, through conductive N-channel transistor 106 to the source of N-channel transistor 106, and to the anode of forward biased signal diode 67, through signal diode 67, and from the cathode of signal diode 67 to node 88. Therefore, as compared to the clamp described above in connection with FIG. 11 that stopped clamping when the voltage VRECT decreased to 360 volts, the smart clamp circuit 104 of FIG. 22 continues clamping until the voltage VRECT decreases past 360 volts and down to 310 volts. This longer clamping action (as compared to the clamp circuit of FIG. 11) dissipates more energy from the inductance of the ballast and helps prevent the lamp from re-igniting. The smart clamp circuit 104, when enabled, performs its clamping function for transistor Q1 drain-to-source voltages (VDS) of approximately 310 volts or greater.

When the smart clamp circuit 104 is not enabled, then signal transistor 106 is non-conductive. The 50 volt zener diode 105 is not shorted. There will therefore not be any ICLP current flow from node 36 (VRECT) and through the zener diodes 69, 68 and 105 unless the voltage difference between VRECT node 36 and node 88 at the gate of transistor Q1 is greater than 360 volts (greater than approximately 360 volts). When the lamp is off in normal operation, VRECT can be expected to be as high as 358 volts as described above. Because 360 volts is required to conduct current ICLP through the smart clamp circuit, the 358 voltage of VRECT will not result in any ICLP current being conducted and transistor switch Q1 will remain off and nonconductive as desired.

The smart clamp circuit 104 is part of a greater circuit referred to here a "smart clamp and control circuit" 108. The smart clamp and control circuit 108 includes the smart clamp circuit 104 itself, as well as control and drive circuitry including components 57-66. The smart clamp and control circuit 108 receives the signals TMEN and OFF and SC_ON, and connects to the drain and gate of the main switch transistor Q1, and drives an appropriate control voltage onto the gate of transistor Q1. The smart clamp and control circuit 108 also connects to ground potential. That connection to ground potential can be a direct connection to ground potential at the source of transistor Q1, or as illustrated in the example of FIG. 22 that connection can be at node 37 that is connected through small resistance 40 to the source of transistor Q1. The gate drive voltage output by this circuit 108 is a function of the input signals TMEN, OFF, SC_ON, and the voltage between the drain of the main switch transistor Q1 and ground potential.

Circuit 108 can be implemented as a discrete integrated circuit component having terminals TMEN, OFF, SC_ON, transistor drain, ground, and transistor gate. In some embodiments, only one terminal is provided to receive both signals TMEN and SC_ON. In some embodiments, transistor Q1 is provided as part of the discrete integrated circuit. If integrated as such a discrete integrated circuit, a temperate detector can be provided as part of the integrated circuit that detects the temperature of main transistor Q1 and prevents transistor Q1 from conducting current in an over-temperature situation where the detected temperature exceeds a predetermined temperature. The discrete integrated circuit is usable outside the described use in a fluorescent starter unit, and is of general applicability in circuits where energy in an inductance is to be dissipated when current flow through the inductance is to be stopped quickly.

Figure 23:
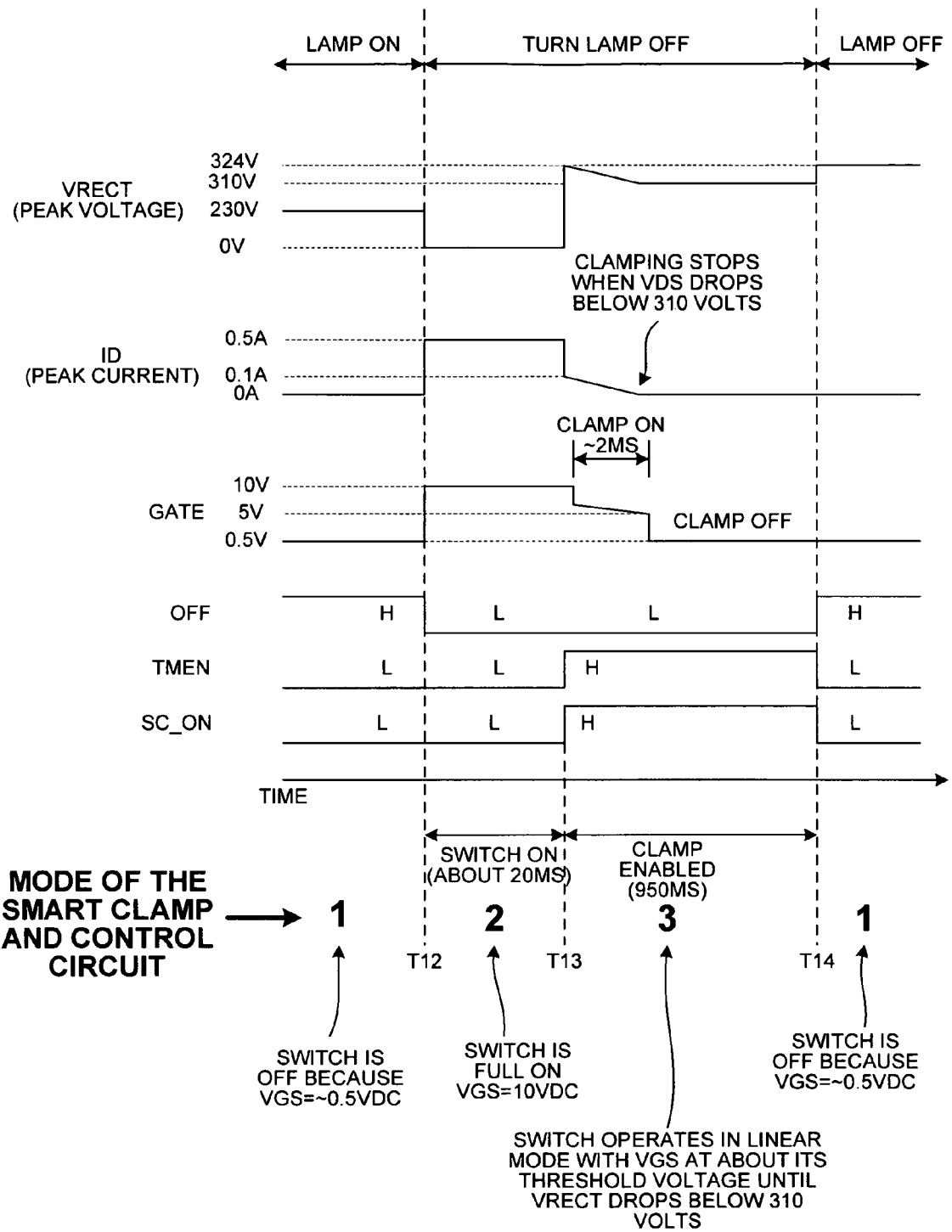
FIG. 23 is a simplified waveform diagram that illustrates the various steps of a lamp turn off operation.

FIG. 23 is a simplified waveform diagram that illustrates the various steps of a lamp turn off cycle. Smart clamp and control circuit 108 is said to operate in one of three modes, denoted "1", "2" and "3" in FIG. 23. Initially, the lamp is in normal operation and the lamp is on as indicated at the left in FIG. 23. Circuit 108 operates in mode 1. Due to the lamp being on, VRECT is approximately 160 volts VRMS (which is approximately 230 peak-to-peak). VRECT in the diagram is the peak voltage of the AC voltage waveform.

Next, the turn off cycle is initiated at time T12 by setting signal OFF to a digital logic low as indicated (TMEN is low and SC_ON is low). Circuit 108 is made to operate in mode 2. VRECT falls to approximately zero volts because transistor Q1 is on and conductive. This causes the lamp to be extinguished. The gate of transistor Q1 is being driven with +10 volts.

Next, the smart clamp is enabled at time T13 by asserting TMEN to a digital logic high and by asserting SC_ON to a digital logic high as illustrated. Circuit 108 is made to operate in mode 3. The voltage on the gate of transistor Q1 is somewhat higher than 5.0 volts due to the fact that VRECT is greater than 310 volts. The amount that the gate voltage exceeds 5.0 volts is proportional to the amount VRECT exceeds 310 volts. The transistor therefore operates in its linear region of operation. As VRECT decreases and the inductance of the ballast is discharged, the gate voltage supplied to transistor Q1 decreases as illustrated. When VRECT has decreased down to 310 volts, then the zener diodes of the smart clamp circuit stop conducting current. Transistor Q2 can then pull the gate voltage of transistor Q1 down to 0.5 volts so that transistor Q1 is turned off. This is noted in FIG. 23 by the "CLAMP OFF" notation.

Then finally, the turn off cycle is terminated at time T14 by asserting OFF to a digital high, by deasserting TMEN to a digital low, and by deasserting SC_ON to a digital low. This causes transistor Q5 to pull the voltage on the gate of transistor Q1 down to approximately 0.5 volts so that transistor Q1 is maintained in the off condition. The lamp, which is now extinguished, remains off. In mode 1, when the lamp if off during normal operation, SC_ON is a digital logic low. Accordingly, the zener diodes of the smart clamp will not conduct current for VRECT voltages below 360 volts.

Figure 25:
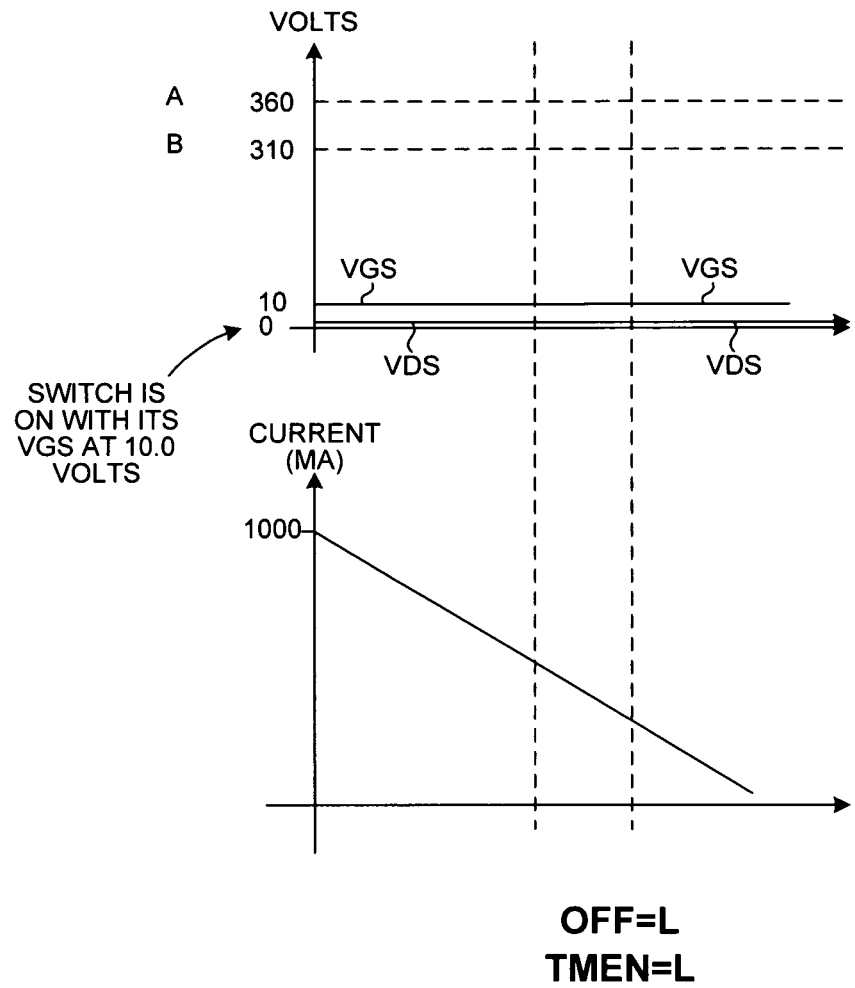
FIG. 25 is a simplified diagram that illustrates operation of the circuitry of FIG. 22 in mode 2.
Figure 26:
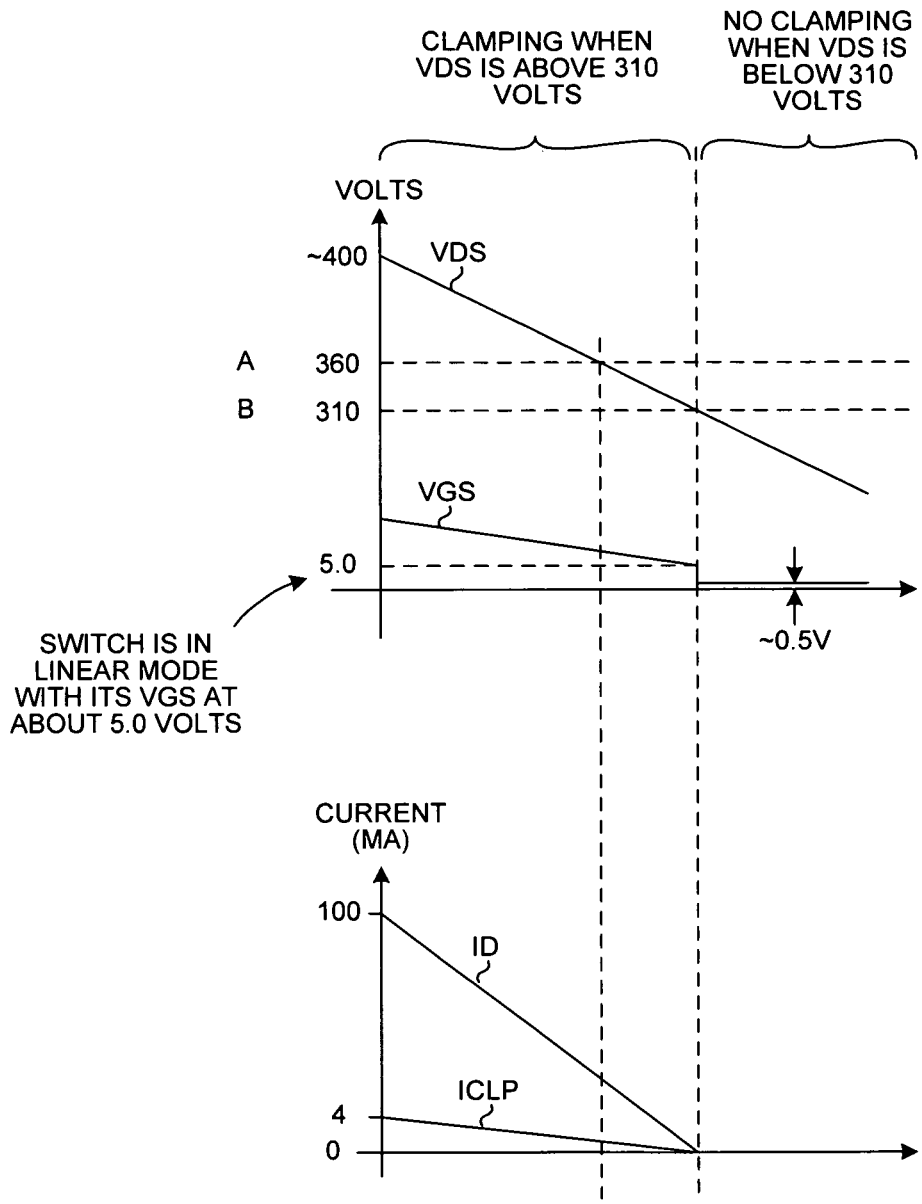
FIG. 26 is a simplified diagram that illustrates operation of the circuitry of FIG. 22 in mode 3.
Figure 27:
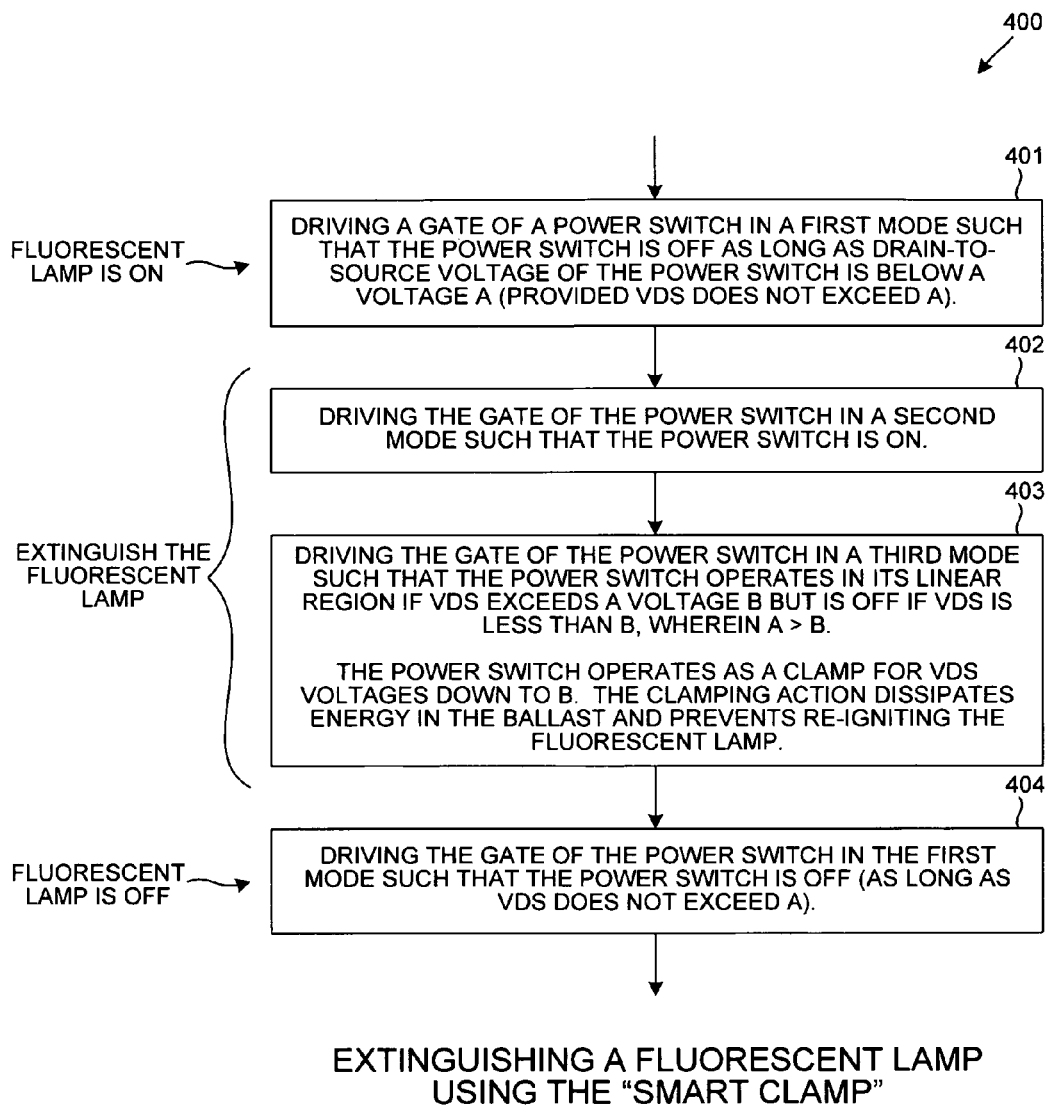
FIG. 27 is a flowchart of method of extinguishing a fluorescent lamp using the "smart clamp" circuitry of FIG. 22.

For a more accurate and detailed understanding of the smart clamp circuit of FIG. 22, the circuit should be built and tested and studied. Alternatively, the circuit can be simulated using a circuit simulator such as SPICE. FIGS. 25, 26 and 27 are provided only as an aid in understanding operation of the smart clamp and control circuit 108 in the three modes: mode 1, mode 2 and mode 3. The actual circuit 108 does not operate at all voltages and current combinations depicted.

Figure 24:
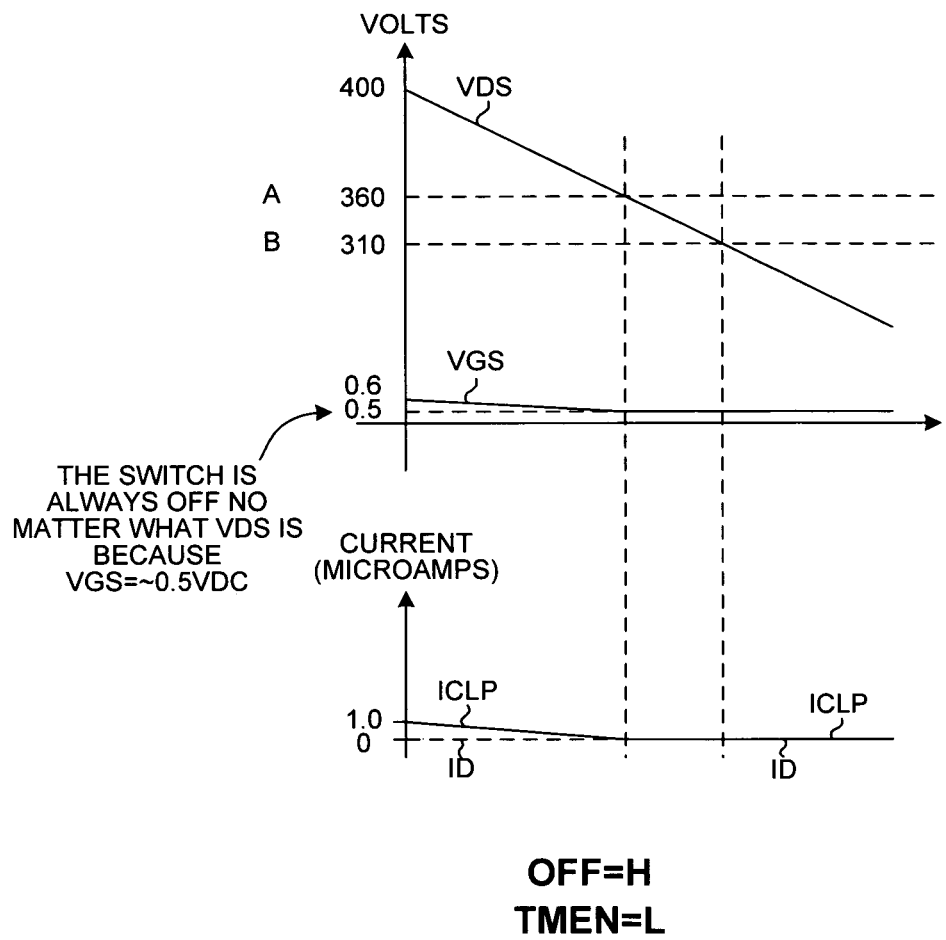
FIG. 24 is a simplified diagram that illustrates operation of the circuitry of FIG. 22 in mode 1.

FIG. 24 is a simplified diagram that illustrates operation of the smart clamp and control circuit 108 in mode 1. Voltage A represents the VRECT voltage at which the zener diodes of the smart clamp begin to conduct current when the smart clamp is disabled (SC_ON=L). Voltage B represents the VRECT voltage at which the zener diodes of the smart clamp begin to conduct current when the smart clamp is enabled (SC_ON=H). VDS is the drain-to-source voltage of transistor Q1; VGS is the gate-to-source voltage of transistor Q1; ID is the drain current of transistor Q1, and ICLP is the current flowing through the zener diodes of the smart clamp circuit. Accordingly, for VDS (VRECT) voltages below 360 volts, the zener diodes of the smart clamp do not conduct current (ICLP is zero).

FIG. 25 is a simplified diagram that illustrates operation of the smart clamp and control circuit 108 in mode 2. The gate of transistor Q1 is being driven with +10 volts, and transistor Q1 is on and conductive. The drain-to-source voltage across the transistor is therefore approximately zero volts.

FIG. 26 is a simplified diagram that illustrates operation of the smart clamp and control circuit 108 in mode 3. The gate voltage of transistor Q1 (VGS) is 5.0 volts plus an amount that is proportional to the voltage difference between VDS (or VRECT) and 310 volts. Accordingly as VDS (VRECT) decreases from the illustrated 400 volts down to 310 volts, the gate voltage decreases as illustrated. The drain-to-source conductivity of transistor Q1 is roughly proportional to VDS minus B. For further decreases in VDS (VRECT) below 310 volts, however, the gate voltage remains fixed at about 0.5 volts.

In some embodiments, diode 105 is not provided. When the smart clamp is disabled, there can be no current flow through the zener diodes 68 and 69 regardless of the voltage VRECT, even if the VRECT voltage exceeds 360 volts. Signal transistor 106 is turned off, and the current path through the zener diodes is broken for all VRECT voltages. In such embodiments, however, transistor 106 must be able to withstand the higher breakdown voltages it might experience, and this may require that transistor 106 to be a more expensive component. Providing zener diode 105 in parallel with transistor 106 protects transistor 106 from harmful high voltages and allows a less expensive lower-breakdown voltage transistor to be used for transistor 106.

FIG. 27 is a flowchart of method 400 in accordance with one novel aspect. A first step (step 401) involves driving a gate of a power switch in a first mode such that the power switch is off (provided VDS of the power switch does not exceed voltage A). The "mode" here indicates a mode of the smart clamp and control circuit 108 of FIG. 22. In this condition, in one example, a fluorescent lamp coupled to the power switch is on and the power switch should not operate as a clamp nor should it conduct current.

A second step (step 402) involves driving the gate in a second mode (mode of circuit 108) such that the power switch is on. In the example with the fluorescent lamp, this turning on of the power switch extinguishes the lamp but energy still remains stored in the inductance of the ballast of the lamp fixture.

A third step (step 403) involves driving the gate in a third mode (mode of circuit 108) such that the power switch operates in its linear region if VDS exceeds a voltage B but is off if VDS is less than B, where A is greater than B. The power switch is operating as a clamp for VDS voltages down to voltage B. This clamping action dissipates energy previously stored in the inductance of the ballast and prevents re-igniting the fluorescent lamp.

A fourth step (step 404) involves driving the gate in the first mode (mode of circuit 108) such that the power switch is off (provided VDS of the power switch does not exceed voltage A).

Voltage A may, for example, be a voltage slightly below the maximum peak voltage that may appear across the fluorescent lamp when the lamp is off and when AC mains power is present across the lamp in the lamp's off state. Voltage B may, for example, be a voltage substantially below voltage A. Voltage B may be a voltage slightly below a voltage at which the lamp may otherwise re-ignite were the smart clamping action down to voltage B not performed. In a turn off operation of the fluorescent lamp, the steps are performed in the order of the first, second, third and fourth steps.

Although certain specific embodiments are described above for instructional purposes, the teachings of this patent document have general applicability and are not limited to the specific embodiments described above. Although the clamp circuit is described above in connection with a fluorescent lamp circuit, the clamp circuit is of general applicability and sees use in other applications where current flow in an inductor is to be cut, and where energy stored in the inductor is to be dissipated to avoid high voltage situations at the end of the current cutting process. The clamping circuit need not be implemented as specifically set forth above, but rather can be implemented without zener diodes and need not involve a transistor in parallel with a zener diode. Other factors such as temperature can be involved in determining the mode of the switch at various stages during the current cutting process. One or both of the voltages A and B can be made digitally programmable by microcontroller 30. Accordingly, various modifications, adaptations, and combinations of various features of the described embodiments can be practiced without departing from the scope of the invention as set forth in the claims.

What is claimed is:

1. A circuit comprising:
    a transistor having a source, a gate and a drain, the transistor having a drain-to-source voltage VDS, the transistor having a gate-to-source voltage VGS; and
    a clamp and control circuit that: (1) in a first mode drives the gate of the transistor such that the transistor is off provided VDS does not exceed a voltage A, (2) in a second mode drives the transistor such that the transistor is on, and (3) in a third mode drives the gate of the transistor such that the transistor operates in its linear region if VDS exceeds a voltage B but is off if VDS is less than B, wherein A is greater than B.

2. The circuit of claim 1, wherein the clamp and control circuit drives the gate of the transistor in the third mode such that a drain-to-source conductivity of the transistor increases with increasing VDS provided that VDS is greater than B, whereas in the third mode if VDS is smaller than B then the clamp and control circuit drives the VGS of the transistor to be approximately zero volts.

3. The circuit of claim 1, wherein the clamp and control circuit drives the gate of the transistor in the third mode such that a drain-to-source conductivity of the transistor is roughly proportional to VDS minus B in conditions in which VDS is greater than B, whereas in the third mode if VDS is smaller than B then the clamp and control circuit drives the VGS of the transistor to be approximately zero volts.

4. The circuit of claim 1, wherein the drain of the transistor is a part of a node, and wherein the clamp and control circuit draws substantially no current from the node in the first mode in conditions in which VDS is less than A.

5. The circuit of claim 1, wherein the clamp and control circuit comprises:
    a first zener diode;
    a second zener diode coupled in series with the first zener diode; and
    a transistor coupled in parallel with the second zener diode.

6. The circuit of claim 5, wherein in the third mode the transistor of the clamp and control circuit is on and a current path extends both through the first zener diode and also through the transistor of the clamp and control circuit if VDS exceeds the voltage B, and wherein in the first mode the transistor of the clamp and control circuit is off.

7. The circuit of claim 5, wherein the clamp and control circuit further comprises:
    a resistor coupled in series with the first zener diode, wherein the current path also extends through the resistor if VDS exceeds the voltage B when the clamp and control circuit is in the third mode.

8. The circuit of claim 1, wherein the circuit is a fluorescent lamp starter unit, and wherein the clamp and control circuit receives a digital control input signal.

9. The circuit of claim 1, wherein the circuit is a fluorescent lamp control circuit that can ignite a fluorescent lamp and that can extinguish the fluorescent lamp, wherein the fluorescent lamp control circuit can extinguish the fluorescent lamp by turning on the transistor for a time and then operating the transistor in its linear mode for a time and then turning off the transistor.

10. The circuit of claim 1, further comprising:
    a full wave rectifier that supplies a full wave rectified signal onto the drain of the transistor.

11. A circuit, comprising:
    a power switch having a source, a gate and a drain;
    a voltage translation and gate drive circuit coupled to the gate of the power switch; and
    a clamp circuit coupled between the drain of the power switch and the gate of the power switch, wherein the clamp circuit comprises:
        a first zener diode;
        a second zener diode coupled in series with the first zener diode; and
        a transistor coupled in parallel with the second zener diode.

12. The circuit of claim 11, further comprising:
    a microcontroller that supplies a first control signal to the voltage translation and gate drive circuit and that supplies a second control signal to the transistor.

13. The circuit of claim 12, wherein the circuit is a fluorescent lamp control circuit.

14. The circuit of claim 13, wherein the circuit is adapted to turn off a fluorescent lamp coupled to the circuit by first turning on the power switch for a first period of time and then by causing the power switch to operate in its linear region so that a ballast inductance is substantially discharged, and then by turning off the power switch.

15. A method comprising:
    (a) driving a gate of a power switch in a first mode such that the power switch is off provided a drain-to-source voltage VDS of the power switch does not exceed a voltage A;
    (b) driving the gate of the power switch in a second mode such that the power switch is on; and
    (c) driving the gate of the power switch in a third mode such that the power switch operates in its linear region if VDS exceeds a voltage B but is off if VDS is less than B, wherein A is greater than B.

16. The method of claim 15, wherein the method is a method of extinguishing a fluorescent lamp, and wherein (a), (b) and (c) are performed one after another in the order (a), (b) and (c), and wherein the method further comprises:
    (d) driving the gate of the power switch in the first mode such that the power switch is off provided drain-to-source voltage VDS of the power switch does not exceed A, wherein (d) is performed after (c).

17. The method of claim 15, wherein in the third mode the gate of the power switch is driven such that a conductivity of the power switch increases with increasing VDS provided that VDS is greater than B.

18. The method of claim 15, wherein operation of the power switch in its linear region in (c) involves dissipating energy stored in an inductor.

19. The method of claim 15, wherein a fluorescent lamp is extinguished by driving the power switch in the second mode for a first period of time, and then driving the power switch transistor in the third mode for a second period of time.

20. The method of claim 15, wherein a clamp circuit is coupled to a drain of the power switch and to a gate of the power switch, wherein the clamp circuit includes a zener diode and a transistor coupled in parallel with the zener diode, wherein the transistor of the clamp circuit is controlled to be non-conductive when the gate of the power switch transistor is being driven in the first mode and in the second mode, and wherein the transistor of the clamp circuit is controlled to be conductive when the gate of the power switch is being driven in the third mode.

21. A circuit comprising:
   a power transistor having a source, a gate and a drain, the power transistor having a drain-to-source voltage VDS, the power transistor having a gate-to-source voltage VGS; and
   means for driving the power transistor such that: (1) in a first mode the power transistor is off provided VDS does not exceed a voltage A, (2) in a second mode the power transistor is on, and (3) in a third mode the power transistor operates in its linear region if VDS exceeds a voltage B but is off if VDS is less than B, wherein A is greater than B.

22. The circuit of claim 21, wherein the means for driving comprises:
   a voltage translation and gate drive circuit coupled to the gate of the power transistor; and
   a clamp circuit coupled between the drain of the power transistor and the gate of the power transistor, wherein the clamp circuit comprises a first zener diode, a second zener diode coupled in series with the first zener diode, and a signal transistor coupled in parallel with the second zener diode.

23. The circuit of claim 21, and wherein the means receives at least two digital control input signals, and wherein the at least two digital control input signals determine whether the means drives the power transistor in the first mode, in the second mode, or in the third mode.

24. A circuit comprising:
   a rectifier;
   a power switch coupled to the rectifier, wherein the power switch has a drain and a gate; and
   a clamp circuit that is coupled to the drain and that is coupled to the gate, wherein the clamp circuit comprises:
      a first zener diode;
      a second zener diode coupled in series with the first zener diode; and
      a transistor coupled in parallel with the second zener diode.

25. The circuit of claim 24, wherein the rectifier is coupled to an inductive element, and wherein the power switch is controlled to dissipate energy stored in the inductive element.

26. The circuit of claim 24, wherein the circuit is a fluorescent lamp control circuit, and wherein circuit further comprises:
   a first terminal adapted to be coupled to a first part of a fluorescent lamp; and
   a second terminal adapted to be coupled to a second part of the fluorescent lamp, wherein the first and second terminals are coupled to the rectifier.

* * * * *